United States Patent
Raphael et al.

(10) Patent No.: US 9,841,943 B1
(45) Date of Patent: Dec. 12, 2017

(54) CREATION AND CONTROL OF CHANNELS THAT PROVIDE ACCESS TO CONTENT FROM VARIOUS AUDIO-PROVIDER SERVICES

(71) Applicant: Google Inc., Mountain View, CA (US)

(72) Inventors: Seth Raphael, Mountain View, CA (US); Ben Murdoch, Mountain View, CA (US); Matthew David Tait, Mountain View, CA (US); Cody Sumter, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/174,243

(22) Filed: Jun. 6, 2016

(51) Int. Cl.
| | |
|---|---|
| *G06F 17/00* | (2006.01) |
| *G06F 3/16* | (2006.01) |
| *G06F 3/02* | (2006.01) |
| *G06F 3/01* | (2006.01) |
| *H04W 4/00* | (2009.01) |
| *H04W 4/20* | (2009.01) |

(52) U.S. Cl.
CPC .............. *G06F 3/165* (2013.01); *G06F 3/017* (2013.01); *G06F 3/02* (2013.01); *H04W 4/001* (2013.01); *H04W 4/20* (2013.01)

(58) Field of Classification Search
CPC ............ G06F 3/017; G06F 3/02; G06F 3/165; H04W 4/001; H04W 4/20
USPC ........ 700/94; 348/14.1–14.16; 370/259–271, 370/351–357; 379/67.1–88.28, 93.01, 379/93.09–93.13, 100.06, 101.01, 201.01, 379/202.01–207.01; 709/201–207, 709/217–248
See application file for complete search history.

(56) References Cited

U.S. PATENT DOCUMENTS

| | | | |
|---|---|---|---|
| 7,568,213 B2 * | 7/2009 | Carhart | H04H 20/103 700/94 |
| 9,110,541 B1 * | 8/2015 | Zhou | G06F 3/042 |

(Continued)

OTHER PUBLICATIONS

International Search Report and Written Opinion for corresponding PCT application No. PCT/US2017/035955, dated Sep. 8, 2017.

*Primary Examiner* — Hemant Patel
(74) *Attorney, Agent, or Firm* — McDonnell Boehnen Hulbert & Berghoff LLP

(57) ABSTRACT

Example implementations may relate to creation and control of channels. In particular, a computing device may receive a first channel-addition request indicating content from a first audio-provider service and may responsively send to a server an instruction to establish a first channel that provides access to content from the first audio-provider service via an application-program account. With this arrangement, a subsequent second channel-addition request may then similarly lead to establishment of a second channel that provides access to content from the second audio-provider service via the application-program account. After channel-additions, the device may determine a first selection of the added first channel and may responsively cause content from the first audio-provider service to be output by an audio output device. Then, the device may determine a second selection of the added second channel and responsively cause content from the second audio-provider service to be output by the audio output device.

32 Claims, 19 Drawing Sheets

(56) References Cited

U.S. PATENT DOCUMENTS

| | | | |
|---|---|---|---|
| 2002/0002039 A1* | 1/2002 | Qureshey | G06F 17/30749 455/344 |
| 2009/0061764 A1* | 3/2009 | Lockhart | G06F 17/30017 455/3.06 |
| 2011/0054647 A1 | 3/2011 | Chipchase | |
| 2011/0066438 A1* | 3/2011 | Lindahl | G10L 13/033 704/258 |
| 2011/0066941 A1 | 3/2011 | Chipchase | |
| 2013/0287212 A1* | 10/2013 | Marko | H04H 20/88 381/2 |
| 2014/0309760 A1* | 10/2014 | Liu | G06F 3/165 700/94 |

\* cited by examiner

CREATION AND CONTROL OF CHANNELS THAT PROVIDE ACCESS TO CONTENT FROM VARIOUS AUDIO-PROVIDER SERVICES

BACKGROUND

Computing devices such as personal computers, laptop computers, tablet computers, cellular phones, wearable devices, and countless types of Internet-capable devices are increasingly prevalent in numerous aspects of modern life. Over time, the manner in which these devices are providing information to users is becoming more intelligent, more efficient, more intuitive, and/or less obtrusive. As these computing devices become increasingly prevalent in numerous aspects of modern life, the need for platforms that provide for intuitive interaction with audio content becomes apparent. Therefore, a demand for such platforms has helped open up a field of innovation in software, sensing techniques, and content organization techniques.

SUMMARY

Example implementations relate to a platform for creation and control of channels that provide access to audio content from various sources, such as from audio-provider services (e.g., a third-party application program through which a user can listen to certain audio content) and/or from locally stored content on a user's computing device. In practice, the platform could be provided via an application program referred to herein as a "companion" application program. Moreover, a user could set up an individual account through the companion application, so that the user can create and control channels via that account, which is referred to herein as an application-program account.

In an example scenario, a computing device may receive (e.g., based on a gesture that a user provides) a request to add a channel that provides access to content from a certain audio-provider service. Upon this request, the computing device may coordinate with a server to establish that channel so that the channel provides access to that content from the audio-provider service via the application-program account (e.g., through interaction with the companion application on the computing device). Then, at a later point in time, the computing device may receive (e.g., based on a further gesture that a user provides) another request to add a different channel that provides access to content from a different audio-provider service. Upon this request, the computing device may again coordinate with the server to establish the different channel so that the different channel provides access to the content from the different audio-provider service via the application-program account. As such, once these channels have been added, a user could then use the companion application to navigate between these added channels and/or through content associated with those channels.

In one aspect, a computing device is provided. The computing device includes at least one input device operable to receive input data associated with an application-program account corresponding to the computing device, an audio output device, one or more processors, a non-transitory computer readable medium, and program instructions stored on the non-transitory computer readable medium and executable by the one or more processors. In particular, the program instructions are executable to determine that the input data comprises a first channel-addition request indicating content from a first audio-provider service. Also, the program instructions are executable to, in response to the first channel-addition request, send to a server an instruction to establish a first channel, where the first channel provides access to content from the first audio-provider service via the application-program account. Additionally, the program instructions are executable to subsequently determine that the input data comprises a second channel-addition request indicating content from a second audio-provider service. Further, the program instructions are executable to, in response to the second channel-addition request, send to the server an instruction to establish a second channel, where the second channel provides access to content from the second audio-provider service via the application-program account. Yet further, the program instructions are executable to determine a first selection of the added first channel and responsively cause content from the first audio-provider service to be output by the audio output device. Yet further, the program instructions are executable to determine a second selection of the added second channel and responsively cause content from the second audio-provider service to be output by the audio output device.

In another aspect, a server is provided. The server includes one or more processors, a non-transitory computer readable medium, program instructions stored on the non-transitory computer readable medium and executable by the one or more processors. In particular, the program instructions are executable to receive a first channel-addition request indicating content from a first audio-provider service. Also, the program instructions are executable to, in response to receiving the first channel-addition request, establish a first channel that provides access to content from the first audio-provider service via an application-program account corresponding to a computing device. Additionally, the program instructions are executable to receive a second channel-addition request indicating content from a second audio-provider service. Further, the program instructions are executable to, in response to receiving the second channel-addition request, establish a second channel that provides access to content from the second audio-provider service via the application-program account. Yet further, the program instructions are executable to determine a first selection of the added first channel and responsively send to the computing device a first instruction to output content from the first audio-provider service. Yet further, the program instructions are executable to determine a second selection of the added second channel and responsively send to the computing device a second instruction to output content from the second audio-provider service.

In yet another aspect, a method is provided. The method involves determining, by a computing device comprising at least one input device operable to receive input data associated with an application-program account corresponding to the computing device, that the input data comprises a first channel-addition request indicating content from a first audio-provider service, wherein the computing device further comprises an audio output device. The method also involves, in response to the first channel-addition request, the computing device sending to a server an instruction to establish a first channel, where the first channel provides access to content from the first audio-provider service via the application-program account. The method additionally involves subsequently determining, by the computing device, that the input data comprises a second channel-addition request indicating content from a second audio-provider service. The method further involves, in response to the second channel-addition request, the computing device sending to the server an instruction to establish a second channel, where the second channel provides access to content from the second audio-provider service via the application-program account. The method further involves determining, by the computing device, a first selection of the added first channel and responsively cause content from the first audio-provider service to be output by the audio output device. The method further involves determining, by the computing device, a second selection of the added second channel and responsively cause content from the second audio-provider service to be output by the audio output device.

In yet another aspect, another method is provided. The method involves receiving, by a server, a first channel-addition request indicating content from a first audio-provider service. The method also involves, in response to receiving the first channel-addition request, the server establishing a first channel that provides access to content from the first audio-provider service via an application-program account corresponding to a computing device. The method additionally involves receiving, by the server, a second channel-addition request indicating content from a second audio-provider service. The method further involves, in response to receiving the second channel-addition request, the server establishing a second channel that provides access to content from the second audio-provider service via the application-program account. The method further involves determining, by the server, a first selection of the added first channel and responsively send to the computing device a first instruction to output content from the first audio-provider service. The method further involves determining, by the server, a second selection of the added second channel and responsively send to the computing device a second instruction to output content from the second audio-provider service.

In yet another aspect, a system is provided. The system may include means for determining that input data comprises a first channel-addition request indicating content from a first audio-provider service. The system may also include means for, in response to the first channel-addition request, sending to a server an instruction to establish a first channel, where the first channel provides access to content from the first audio-provider service via an application-program account. The system may additionally include means for subsequently determining that input data comprises a second channel-addition request indicating content from a second audio-provider service. The system may further include means for, in response to the second channel-addition request, sending to the server an instruction to establish a second channel, where the second channel provides access to content from the second audio-provider service via the application-program account. The system may further include means for determining a first selection of the added first channel and responsively causing content from the first audio-provider service to be output by an audio output device. The system may further include means for determining a second selection of the added second channel and responsively causing content from the second audio-provider service to be output by the audio output device.

In yet another aspect, another system is provided. The system may include means for receiving a first channel-addition request indicating content from a first audio-provider service. The system may also include means for, in response to receiving the first channel-addition request, establishing a first channel that provides access to content from the first audio-provider service via an application-program account corresponding to a computing device. The system may additionally include means for receiving a second channel-addition request indicating content from a second audio-provider service. The system may further include means for, in response to receiving the second channel-addition request, establishing a second channel that provides access to content from the second audio-provider service via the application-program account. The system may further include means for determining a first selection of the added first channel and responsively send to the computing device a first instruction to output content from the first audio-provider service. The system may further include means for determining a second selection of the added second channel and responsively send to the computing device a second instruction to output content from the second audio-provider service.

These as well as other aspects, advantages, and alternatives will become apparent to those of ordinary skill in the art by reading the following detailed description, with reference where appropriate to the accompanying drawings.

DETAILED DESCRIPTION

Figure 1:
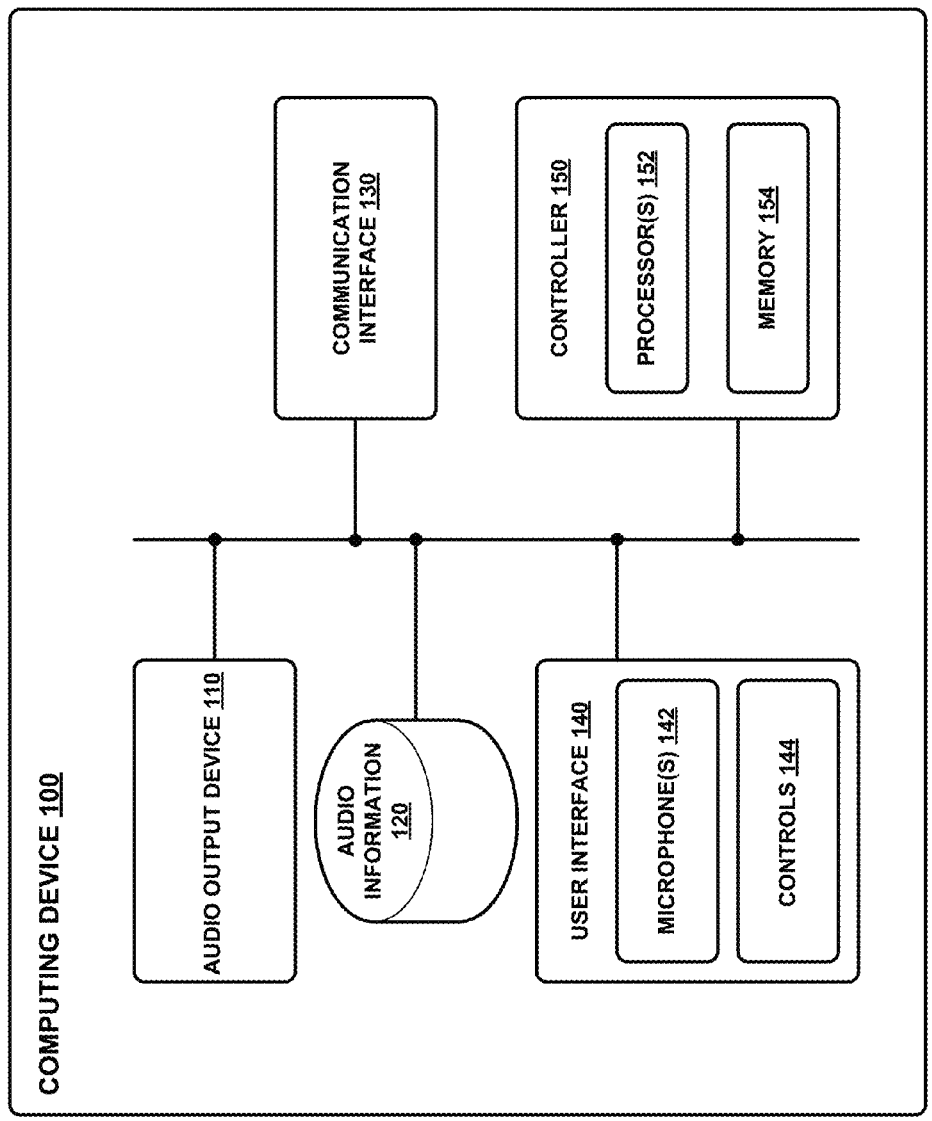
FIG. 1 illustrates a schematic diagram of a computing device, according to an example implementation.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. Overview

In practice, computing devices provide access to audio content from various sources. For instance, a user may use a computing device to access audio content through various third-party application programs on the computing device and/or through a file directory of the computing device, among other possibilities. In doing so, the user may need to navigate through a hierarchy of such application programs and/or file directory. For example, a user may navigate through a music application program to find a particular music playlist to listen to. Then, if the user seeks to change the user's listening experience, the user may need to switch to another application program and then navigate through that application program. For example, the user may switch to a broadcasting application program and may then navigate through that broadcasting application program to find a particular sports radio station which the user seeks to listen to.

Generally, such hierarchical arrangements for navigating through audio content may be relatively time consuming and less intuitive to a user. Moreover, use of a screenless wearable device by a user may present additional difficulties to the user because that user may need to navigate a hierarchy of applications (and/or file directory) through a device that does not have a display. As such, disclosed herein is a platform to help a user navigate through audio content from various sources via a single application program, which may utilized on a screenless wearable device, as well on computing devices having displays (e.g., a smartphone, tablet, head-mountable display, or laptop).

In accordance with an example implementation, the disclosed platform allows for creation and control of channels. In particular, each channel may be a shortcut (a "link") to start playing certain audio content, such as to audio content provided by a third-party service (e.g., music playlist) or to audio content stored locally on a computing device (e.g., an audio book), among other possibilities. As such, a user may use the disclosed platform by interacting with a "companion" application program that is downloadable onto the user's computing device(s), installable onto the user's computing device(s), and/or added to the user's computing device(s) in other ways. Moreover, the user could set up an individual account through the companion application program so that the user could access and control the same channels across multiple computing devices.

After a user creates an individual account, the user could then interact with the companion application program in order to create or otherwise configure various "favorite" channels each providing a shortcut to certain audio content. Once such channels are created, the user may then use various intuitive gestures to transition between these channels and perhaps also between content (e.g., audio tracks) within such channels. In practice, each computing device may have associated gestures specific to that device, so as to allow the user to intuitively navigate the various channels without necessarily having to navigate through a hierarchy of application programs and/or a file directory.

II. Example Computing Devices

FIG. 1 illustrates a schematic diagram of a computing device 100, according to an example implementation. The computing device 100 includes an audio output device 110, audio information 120, a communication interface 130, a user interface 140 (could also be referred to as input device (s) 140), and a controller 150. The user interface 140 may include at least one microphone 142 and controls 144. The controller 150 may include a processor 152 and a memory 154, such as a non-transitory computer readable medium.

The audio output device 110 may include one or more devices configured to convert electrical signals into audible signals (e.g., sound pressure waves). As such, the audio output device 110 may take the form of headphones (e.g., over-the-ear headphones, on-ear headphones, ear buds, wired and wireless headphones, etc.), one or more loudspeakers, or an interface to such an audio output device e.g., a ¼" or ⅛" tip-ring-sleeve (TRS) port, a USB port, etc.). In an example implementation, the audio output device 110 may include an amplifier, a communication interface (e.g., BLUETOOTH interface), and/or a headphone jack or speaker output terminals. Other systems or devices configured to deliver perceivable audio signals to a user are possible.

The audio information 120 may include information indicative of one or more audio signals. For example, the audio information 120 may include information indicative of music, a voice recording (e.g., a podcast, a comedy set, spoken word, etc.), an audio notification, or another type of audio signal. In some implementations, the audio information 120 may be stored, temporarily or permanently, in the memory 154. And in some cases, the audio information 120 may be streamed or otherwise streamed from an external source, such as a server for instance. The computing device 100 may be configured to play audio signals via audio output device 110 based on the audio information 120. The computing device may also be configured to store audio signals recorded using the microphone 142 in the audio information 120.

The communication interface 130 may allow computing device 100 to communicate, using analog or digital modulation, with other devices, access networks, and/or transport networks. Thus, communication interface 130 may facilitate circuit-switched and/or packet-switched communication, such as plain old telephone service (POTS) communication and/or Internet protocol (IP) or other packetized communication. For instance, communication interface 130 may include a chipset and antenna arranged for wireless communication with a radio access network or an access point. Also, communication interface 130 may take the form of or include a wireline interface, such as an Ethernet, Universal Serial Bus (USB), or High-Definition Multimedia Interface (HDMI) port. Communication interface 130 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 130. Furthermore, communication interface 130 may comprise multiple physical communication interfaces (e.g., a Wifi interface, a BLUETOOTH® interface, and a wide-area wireless interface).

In an example implementation, the communication interface 130 may be configured to receive information indicative of an audio signal and store it, at least temporarily, as audio information 120. For example, the communication interface 130 may receive information indicative of a phone call, a notification, streamed audio content, or another type of audio signal. In such a scenario, the communication interface 130 may route the received information to the audio information 120, to the controller 150, and/or to the audio output device 110. The communication interface 130 may also be configured to receive data associated with the audio signal and store it with the audio signal that it's associated. For example, the data associated with the audio signal may include metadata or another type of tag or information. The data associated with the audio signal may also include instructions for outputting the audio signal. For example, the data may include an output deadline, by which to output the audio signal. The communication interface 130 may also be configured to receive an instruction from a computing device to generate an audio signal.

The user interface 140 may include at least one microphone 142 and controls 144. The microphone 142 may include an omni-directional microphone or a directional microphone. Further, an array of microphones could be implemented. In an example implementation, two microphones may be arranged to detect speech by a wearer or user of the computing device 100. The two microphones 142 may direct a listening beam toward a location that corresponds to a wearer's mouth, when the computing device 100 is worn or positioned near a user's mouth. The microphones 142 may also detect sounds in the user's audio environment, such as the speech of others in the vicinity of the user. Other microphone configurations and combinations are contemplated.

The controls 144 may include any combination of switches, buttons, touch-sensitive surfaces, and/or other user input devices. A user may monitor and/or adjust the operation of the computing device 100 via the controls 144. The controls 144 may be used to trigger one or more of the operations described herein.

The controller 150 may include at least one processor 152 and a memory 154. The processor 152 may include one or more general purpose processors—e.g., microprocessors—and/or one or more special purpose processors—e.g., image signal processors (ISPs), digital signal processors (DSPs), graphics processing units (GPUs), floating point units (FPUs), network processors, or application-specific integrated circuits (ASICs). In an example implementation, the controller 150 may include one or more audio signal processing devices or audio effects units. Such audio signal processing devices may process signals in analog and/or digital audio signal formats. Additionally or alternatively, the processor 152 may include at least one programmable in-circuit serial programming (ICSP) microcontroller. The memory 154 may include one or more volatile and/or non-volatile storage components, such as magnetic, optical, flash, or organic storage, and may be integrated in whole or in part with the processor 152. Memory 154 may include removable and/or non-removable components.

Processor 152 may be capable of executing program instructions (e.g., compiled or non-compiled program logic and/or machine code) stored in memory 154 to carry out the various functions described herein. Therefore, memory 154 may include a non-transitory computer-readable medium, having stored thereon program instructions that, upon execution by computing device 100, cause computing device 100 to carry out any of the methods, processes, or operations disclosed in this specification and/or the accompanying drawings. The execution of program instructions by processor 152 may result in processor 152 using data provided by various other elements of the computing device 100. Specifically, the controller 150 and the processor 152 may perform operations on audio information 120. The controller 150 may include a distributed computing network and/or a cloud computing network.

In an example implementation, the computing device 100 may be operable to generate audio signals that represent a variety of audio content such as audio notifications, music, podcasts, news stories, navigational instructions, etc. The generated audio signals may be stored in the audio information 120. Within examples, the controller 150 may generate the audio signals based on instructions from applications running on the computing device 100. The instructions to generate the audio signal may also be received from other computing devices via the communication interface 130. The computing device 100 may also be operable to generate information associated with the audio signal. For example, the computing device 100 may generate an output time for the audio signal. In some examples, the output time may be an output deadline by which the audio signal may be played. Further, as explained above, the computing device 100 may also be configured to receive data associated with the audio the audio signal with which it's associated. For example, the data associated with the audio signal may include metadata or another type of tag or information.

In an example implementation, the computing device 100 may be operable to play audio signals generated or processed by the controller 150. The computing device 100 may play an audio signal, such the audio signals stored in the audio information 120, by driving the audio output device 110 with the audio signal. As such, the computing device 100 may be operable to play audio signals that represent of audio content such as audio notifications, music, podcasts, etc.

While FIG. 1 illustrates the controller 150 as being schematically apart from other elements of the computing device 100, the controller 150 may be physically located at, or incorporated into, one or more elements of the computing device 100. For example, the controller 150 may be incorporated into the audio output device 110, the communication interface 130, and/or the user interface 140. Additionally or alternatively, one or more elements of the computing device 100 may be incorporated into the controller 150 and/or its constituent elements. For example, the audio information 120 may reside, temporarily or permanently, in the memory 154.

Computing device 100 may be provided as having a variety of different form factors, shapes, and/or sizes. For example, the computing device 100 may include a head-mountable device that and has a form factor similar to traditional eyeglasses. Additionally or alternatively, the computing device 100 may take the form of an earpiece. In an example implementation, the computing device 100 may be configured to facilitate voice-based user interactions. However, in other implementations, computing device 100 need not facilitate voice-based user interactions.

The computing device 100 may include one or more devices operable to deliver audio signals to a user's ears and/or bone structure. For example, the computing device 100 may include one or more headphones and/or bone conduction transducers or "BCTs". Other types of devices configured to provide audio signals to a user are contemplated herein.

As a non-limiting example, headphones may include "in-ear", "on-ear", or "over-ear" headphones. "In-ear" headphones may include in-ear headphones, earphones, or earbuds. "On-ear" headphones may include supra-aural headphones that may partially surround one or both ears of a user. "Over-ear" headphones may include circumaural headphones that may fully surround one or both ears of a user.

The headphones may include one or more transducers configured to convert electrical signals to sound. For example, the headphones may include electrostatic, electret, dynamic, or another type of transducer.

A BCT may be operable to vibrate the wearer's bone structure at a location where the vibrations travel through the wearer's bone structure to the middle ear, such that the brain interprets the vibrations as sounds. In an example implementation, a computing device 100 may include an ear-piece with a BCT.

The computing device 100 may be tethered via a wired or wireless interface to another computing device (e.g., a user's smartphone). Alternatively, the computing device 100 may be a standalone device.

FIGS. 2A-2D illustrate several non-limiting examples of devices as contemplated in the present disclosure. As such, the computing device 100 as illustrated and described with respect to FIG. 1 may take the form of any of devices 200, 230, 250, or 260. The computing device 100 may take other forms as well.

Figure 2A:
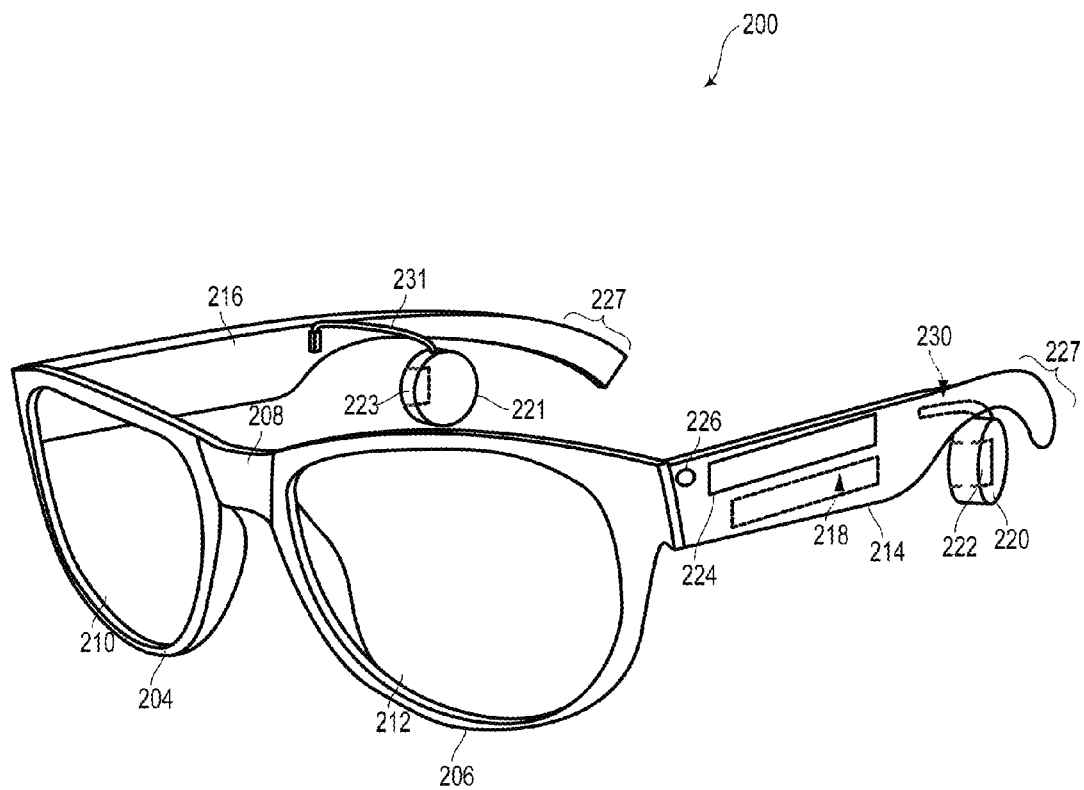
FIG. 2A illustrates a wearable device, according to example implementations.

FIG. 2A illustrates a wearable device 200, according to example implementations. Wearable device 200 may be shaped similar to a pair of glasses or another type of head-mountable device. As such, the wearable device 200 may include frame elements including lens-frames 204, 206 and a center frame support 208, lens elements 210, 212, and extending side-arms 214, 216. The center frame support 208 and the extending side-arms 214, 116 are configured to secure the wearable device 200 to a user's head via placement on a user's nose and ears, respectively.

Each of the frame elements 204, 206, and 208 and the extending side-arms 214, 216 may be formed of a solid structure of plastic and/or metal, or may be formed of a hollow structure of similar material so as to allow wiring and component interconnects to be internally routed through the wearable device 200. Other materials are possible as well. Each of the lens elements 210, 212 may also be sufficiently transparent to allow a user to see through the lens element.

Additionally or alternatively, the extending side-arms 214, 216 may be positioned behind a user's ears to secure the wearable device 200 to the user's head. The extending side-arms 214, 216 may further secure the wearable device 200 to the user by extending around a rear portion of the user's head. Additionally or alternatively, for example, the wearable device 200 may connect to or be affixed within a head-mountable helmet structure. Other possibilities exist as well.

The wearable device 200 may also include an on-board computing system 218 and at least one finger-operable touch pad 224. The on-board computing system 218 is shown to be integrated in side-arm 214 of wearable device 200. However, an on-board computing system 218 may be provided on or within other parts of the wearable device 200 or may be positioned remotely from, and communicatively coupled to, a head-mountable component of a computing device (e.g., the on-board computing system 218 could be housed in a separate component that is not head wearable, and is wired or wirelessly connected to a component that is head wearable). The on-board computing system 218 may include a processor and memory, for example. Further, the on-board computing system 218 may be configured to receive and analyze data from a finger-operable touch pad 224 (and possibly from other sensory devices and/or user interface components).

In a further aspect, the wearable device 200 may include various types of sensors and/or sensory components. For instance, the wearable device 200 could include an inertial measurement unit (IMU) (not explicitly illustrated in FIG. 2A), which provides an accelerometer, gyroscope, and/or magnetometer. In some implementations, the wearable device 200 could also include an accelerometer, a gyroscope, and/or a magnetometer that is not integrated in an IMU.

In a further aspect, the wearable device 200 may include sensors that facilitate a determination as to whether or not the wearable device 200 is being worn. For instance, sensors such as an accelerometer, gyroscope, and/or magnetometer could be used to detect motion that is characteristic of the wearable device 200 being worn (e.g., motion that is characteristic of user walking about, turning their head, and so on), and/or used to determine that the wearable device 200 is in an orientation that is characteristic of the wearable device 200 being worn (e.g., upright, in a position that is typical when the wearable device 200 is worn over the ear). Accordingly, data from such sensors could be used as input to an on-head detection process. Additionally or alternatively, the wearable device 200 may include a capacitive sensor or another type of sensor that is arranged on a surface of the wearable device 200 that typically contacts the wearer when the wearable device 200 is worn. Accordingly data provided by such a sensor may be used to determine whether the wearable device 200 is being worn. Other sensors and/or other techniques may also be used to detect when the wearable device 200 is being worn.

The wearable device 200 also includes at least one microphone 226, which may allow the wearable device 200 to receive voice commands from a user. The microphone 226 may be a directional microphone or an omni-directional microphone. Further, in some implementations, the wearable device 200 may include a microphone array and/or multiple microphones arranged at various locations on the wearable device 200.

In FIG. 2A, touch pad 224 is shown as being arranged on side-arm 214 of the wearable device 200. However, the finger-operable touch pad 224 may be positioned on other parts of the wearable device 200. Also, more than one touch pad may be present on the wearable device 200. For example, a second touchpad may be arranged on side-arm 216. Additionally or alternatively, a touch pad may be arranged on a rear portion 227 of one or both side-arms 214 and 216. In such an arrangement, the touch pad may arranged on an upper surface of the portion of the side-arm that curves around behind a wearer's ear (e.g., such that the touch pad is on a surface that generally faces towards the rear of the wearer, and is arranged on the surface opposing the surface that contacts the back of the wearer's ear). Other arrangements of one or more touch pads are also possible.

The touch pad 224 may sense contact, proximity, and/or movement of a user's finger on the touch pad via capacitive sensing, resistance sensing, or a surface acoustic wave process, among other possibilities. In some implementations, touch pad 224 may be a one-dimensional or linear touchpad, which is capable of sensing touch at various points on the touch surface, and of sensing linear movement of a finger on the touch pad (e.g., movement forward or backward along the touch pad 224). In other implementations, touch pad 224 may be a two-dimensional touch pad that is capable of sensing touch in any direction on the touch surface. Additionally, in some implementations, touch pad 224 may be configured for near-touch sensing, such that the touch pad can sense when a user's finger is near to, but not in contact with, the touch pad. Further, in some implementations, touch pad 224 may be capable of sensing a level of pressure applied to the pad surface.

In a further aspect, earpiece 220 and 211 are attached to side-arms 214 and 216, respectively. Earpieces 220 and 221 may each include a BCT 222 and 223, respectively. Each earpiece 220, 221 may be arranged such that when the wearable device 200 is worn, each BCT 222, 223 is positioned to the posterior of a wearer's ear. For instance, in an exemplary implementation, an earpiece 220, 221 may be arranged such that a respective BCT 222, 223 can contact the auricle of both of the wearer's ears and/or other parts of the wearer's head. Other arrangements of earpieces 220, 221 are also possible. Further, implementations with a single earpiece 220 or 221 are also possible.

In an exemplary implementation, BCT 222 and/or BCT 223 may operate as a bone-conduction speaker. BCT 222 and 223 may be, for example, a vibration transducer or an electro-acoustic transducer that produces sound in response to an electrical audio signal input. Generally, a BCT may be any structure that is operable to directly or indirectly vibrate the bone structure of the user. For instance, a BCT may be implemented with a vibration transducer that is configured to receive an audio signal and to vibrate a wearer's bone structure in accordance with the audio signal. More generally, it should be understood that any component that is arranged to vibrate a wearer's bone structure may be incorporated as a bone-conduction speaker, without departing from the scope of the invention.

In a further aspect, wearable device 200 may include at least one audio source (not shown) that is configured to provide an audio signal that drives BCT 222 and/or BCT 223. As an example, the audio source may provide information that may be stored and/or used by computing device 100 as audio information 120 as illustrated and described in reference to FIG. 1. In an exemplary implementation, the wearable device 200 may include an internal audio playback device such as an on-board computing system 218 that is configured to play digital audio files. Additionally or alternatively, the wearable device 200 may include an audio interface to an auxiliary audio playback device (not shown), such as a portable digital audio player, a smartphone, a home stereo, a car stereo, and/or a personal computer, among other possibilities. In some implementations, an application or software-based interface may allow for the wearable device 200 to receive an audio signal that is streamed from another computing device, such as the user's mobile phone. An interface to an auxiliary audio playback device could additionally or alternatively be a tip, ring, sleeve (TRS) connector, or may take another form. Other audio sources and/or audio interfaces are also possible.

Further, in an implementation with two ear-pieces 222 and 223, which both include BCTs, the ear-pieces 220 and 221 may be configured to provide stereo and/or ambiophonic audio signals to a user. However, non-stereo audio signals (e.g., mono or single channel audio signals) are also possible in devices that include two ear-pieces.

As shown in FIG. 2A, the wearable device 200 need not include a graphical display. However, in some implementations, the wearable device 200 may include such a display. In particular, the wearable device 200 may include a near-eye display (not explicitly illustrated). The near-eye display may be coupled to the on-board computing system 218, to a standalone graphical processing system, and/or to other components of the wearable device 200. The near-eye display may be formed on one of the lens elements of the wearable device 200, such as lens element 210 and/or 212. As such, the wearable device 200 may be configured to overlay computer-generated graphics in the wearer's field of view, while also allowing the user to see through the lens element and concurrently view at least some of their real-world environment. In other implementations, a virtual reality display that substantially obscures the user's view of the surrounding physical world is also possible. The near-eye display may be provided in a variety of positions with respect to the wearable device 200, and may also vary in size and shape.

Other types of near-eye displays are also possible. For example, a glasses-style wearable device may include one or more projectors (not shown) that are configured to project graphics onto a display on a surface of one or both of the lens elements of the wearable device 200. In such a configuration, the lens element(s) of the wearable device 200 may act as a combiner in a light projection system and may include a coating that reflects the light projected onto them from the projectors, towards the eye or eyes of the wearer. In other implementations, a reflective coating need not be used (e.g., when the one or more projectors take the form of one or more scanning laser devices).

As another example of a near-eye display, one or both lens elements of a glasses-style wearable device could include a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame of the wearable device 200 for driving such a matrix display. Alternatively or additionally, a laser or LED source and scanning system could be used to draw a raster display directly onto the retina of one or more of the user's eyes. Other types of near-eye displays are also possible.

Figure 2B:
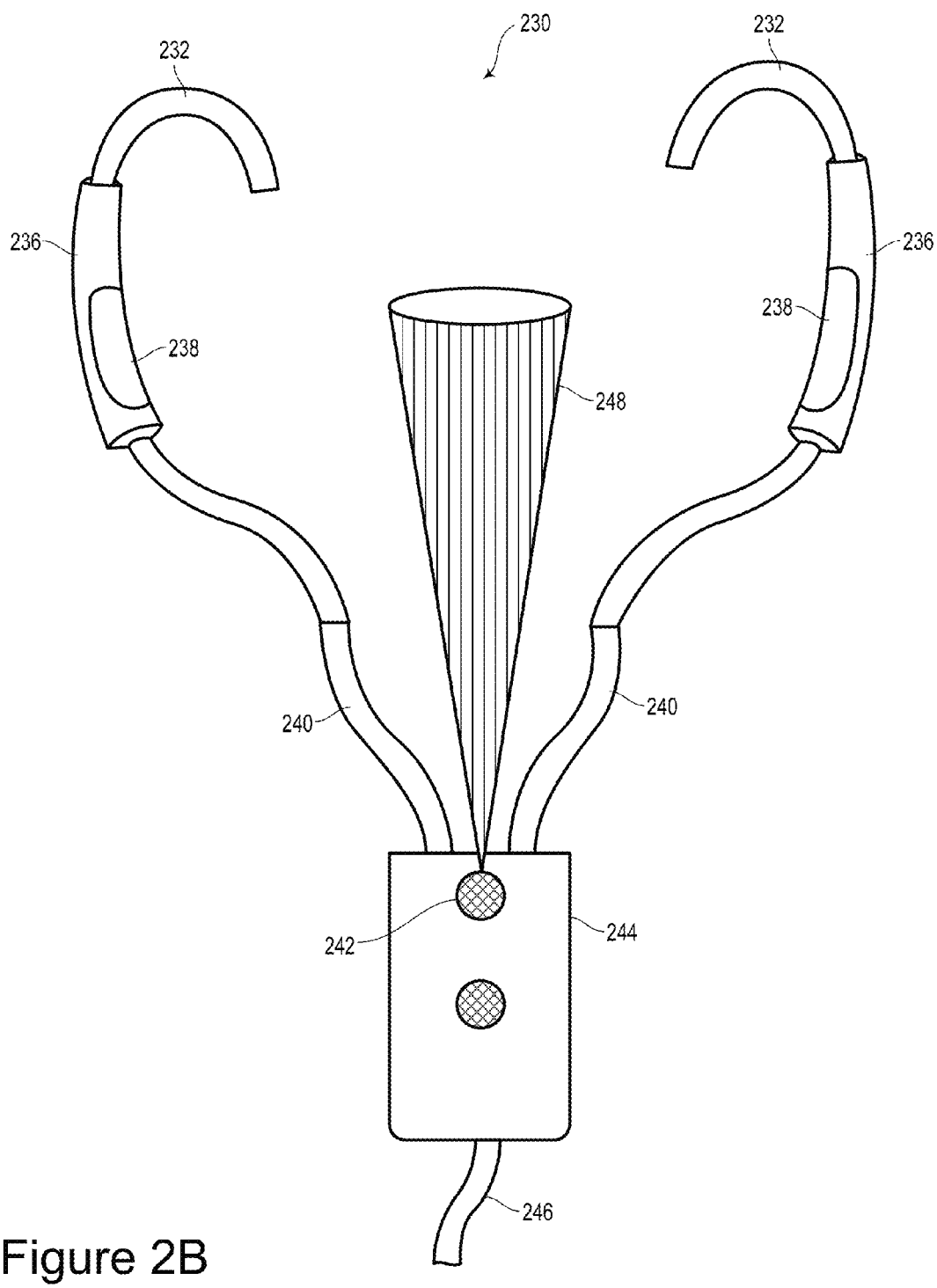
FIG. 2B illustrates a wearable device, according to example implementations.

FIG. 2B illustrates a wearable device 230, according to an example implementation. The device 300 includes two frame portions 232 shaped so as to hook over a wearer's ears. When worn, a behind-ear housing 236 is located behind each of the wearer's ears. The housings 236 may each include a BCT 238. BCT 238 may be, for example, a vibration transducer or an electro-acoustic transducer that produces sound in response to an electrical audio signal input. As such, BCT 238 may function as a bone-conduction speaker that plays audio to the wearer by vibrating the wearer's bone structure. Other types of BCTs are also possible. Generally, a BCT may be any structure that is operable to directly or indirectly vibrate the bone structure of the user.

Note that the behind-ear housing 236 may be partially or completely hidden from view, when the wearer of the device 230 is viewed from the side. As such, the device 230 may be worn more discretely than other bulkier and/or more visible wearable computing devices.

As shown in FIG. 2B, the BCT 238 may be arranged on or within the behind-ear housing 236 such that when the device 230 is worn, BCT 238 is positioned posterior to the wearer's ear, in order to vibrate the wearer's bone structure. More specifically, BCT 238 may form at least part of, or may be vibrationally coupled to the material that forms the behind-ear housing 236. Further, the device 230 may be configured such that when the device is worn, the behind-ear housing 236 is pressed against or contacts the back of the wearer's ear. As such, BCT 238 may transfer vibrations to the wearer's bone structure via the behind-ear housing 236. Other arrangements of a BCT on the device 230 are also possible.

In some implementations, the behind-ear housing 236 may include a touchpad (not shown), similar to the touchpad 224 shown in FIG. 2A and described above. Further, the frame 232, behind-ear housing 236, and BCT 238 configuration shown in FIG. 2B may be replaced by ear buds, over-ear headphones, or another type of headphones or micro-speakers. These different configurations may be implemented by removable (e.g., modular) components, which can be attached and detached from the device 230 by the user. Other examples are also possible.

In FIG. 2B, the device 230 includes two cords 240 extending from the frame portions 232. The cords 240 may be more flexible than the frame portions 232, which may be more rigid in order to remain hooked over the wearer's ears during use. The cords 240 are connected at a pendant-style housing 244. The housing 244 may contain, for example, one or more microphones 242, a battery, one or more sensors, a processor, a communications interface, and onboard memory, among other possibilities.

A cord 246 extends from the bottom of the housing 244, which may be used to connect the device 230 to another device, such as a portable digital audio player, a smartphone, among other possibilities. Additionally or alternatively, the device 230 may communicate with other devices wirelessly, via a communications interface located in, for example, the housing 244. In this case, the cord 246 may be removable cord, such as a charging cable.

The microphones 242 included in the housing 244 may be omni-directional microphones or directional microphones. Further, an array of microphones could be implemented. In the illustrated implementation, the device 230 includes two microphones arranged specifically to detect speech by the wearer of the device. For example, the microphones 242 may direct a listening beam 248 toward a location that corresponds to a wearer's mouth, when the device 230 is worn. The microphones 242 may also detect sounds in the wearer's environment, such as the ambient speech of others in the vicinity of the wearer. Additional microphone configurations are also possible, including a microphone arm extending from a portion of the frame 232, or a microphone located inline on one or both of the cords 240. Other possibilities for providing information indicative of a local acoustic environment are contemplated herein.

Figure 2C:
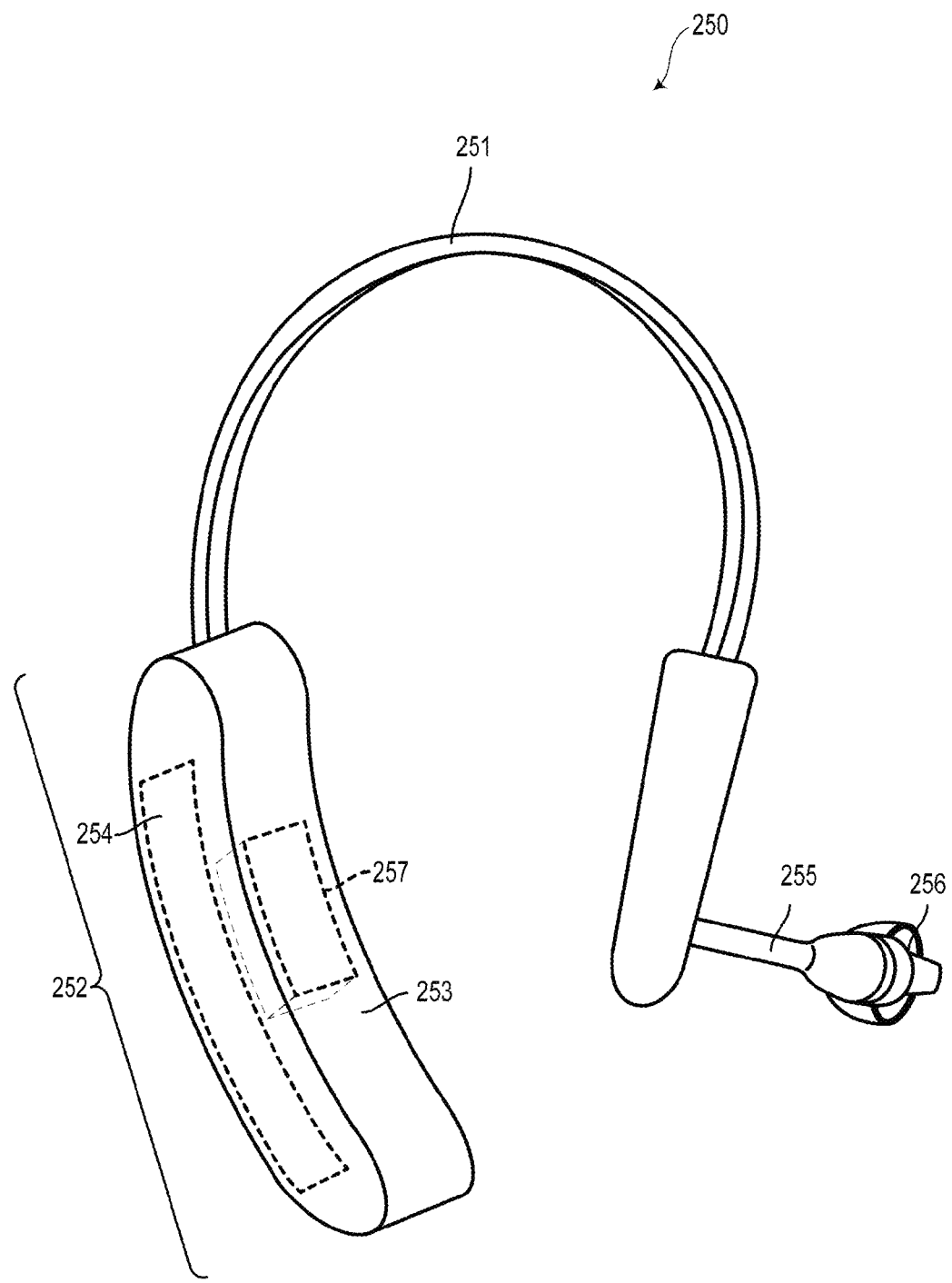
FIG. 2C illustrates a wearable device, according to example implementations.

FIG. 2C illustrates a wearable device 250, according to an example implementation. Wearable device 250 includes a frame 251 and a behind-ear housing 252. As shown in FIG. 2C, the frame 251 is curved, and is shaped so as to hook over a wearer's ear. When hooked over the wearer's ear(s), the behind-ear housing 252 is located behind the wearer's ear. For example, in the illustrated configuration, the behind-ear housing 252 is located behind the auricle, such that a surface 253 of the behind-ear housing 252 contacts the wearer on the back of the auricle.

Note that the behind-ear housing 252 may be partially or completely hidden from view, when the wearer of wearable device 250 is viewed from the side. As such, the wearable device 250 may be worn more discretely than other bulkier and/or more visible wearable computing devices.

The wearable device 250 and the behind-ear housing 252 may include one or more BCTs, such as the BCT 222 as illustrated and described with regard to FIG. 2A. The one or more BCTs may be arranged on or within the behind-ear housing 252 such that when the wearable device 250 is worn, the one or more BCTs may be positioned posterior to the wearer's ear, in order to vibrate the wearer's bone structure. More specifically, the one or more BCTs may form at least part of, or may be vibrationally coupled to the material that forms, surface 253 of behind-ear housing 252. Further, wearable device 250 may be configured such that when the device is worn, surface 253 is pressed against or contacts the back of the wearer's ear. As such, the one or more BCTs may transfer vibrations to the wearer's bone structure via surface 253. Other arrangements of a BCT on an earpiece device are also possible.

Furthermore, the wearable device 250 may include a touch-sensitive surface 254, such as touchpad 224 as illustrated and described in reference to FIG. 2A. The touch-sensitive surface 254 may be arranged on a surface of the wearable device 250 that curves around behind a wearer's ear (e.g., such that the touch-sensitive surface generally faces towards the wearer's posterior when the earpiece device is worn). Other arrangements are also possible.

Wearable device 250 also includes a microphone arm 255, which may extend towards a wearer's mouth, as shown in FIG. 2C. Microphone arm 255 may include a microphone 256 that is distal from the earpiece. Microphone 256 may be an omni-directional microphone or a directional microphone. Further, an array of microphones could be implemented on a microphone arm 255. Alternatively, a bone conduction microphone (BCM), could be implemented on a microphone arm 255. In such an implementation, the arm 255 may be operable to locate and/or press a BCM against the wearer's face near or on the wearer's jaw, such that the BCM vibrates in response to vibrations of the wearer's jaw that occur when they speak. Note that the microphone arm 255 is optional, and that other configurations for a microphone are also possible.

In some implementations, the wearable devices disclosed herein may include two types and/or arrangements of microphones. For instance, the wearable device may include one or more directional microphones arranged specifically to detect speech by the wearer of the device, and one or more omni-directional microphones that are arranged to detect sounds in the wearer's environment (perhaps in addition to the wearer's voice). Such an arrangement may facilitate intelligent processing based on whether or not audio includes the wearer's speech.

In some implementations, a wearable device may include an ear bud (not shown), which may function as a typical speaker and vibrate the surrounding air to project sound from the speaker. Thus, when inserted in the wearer's ear, the wearer may hear sounds in a discrete manner. Such an ear bud is optional, and may be implemented by a removable (e.g., modular) component, which can be attached and detached from the earpiece device by the user.

Figure 2D:
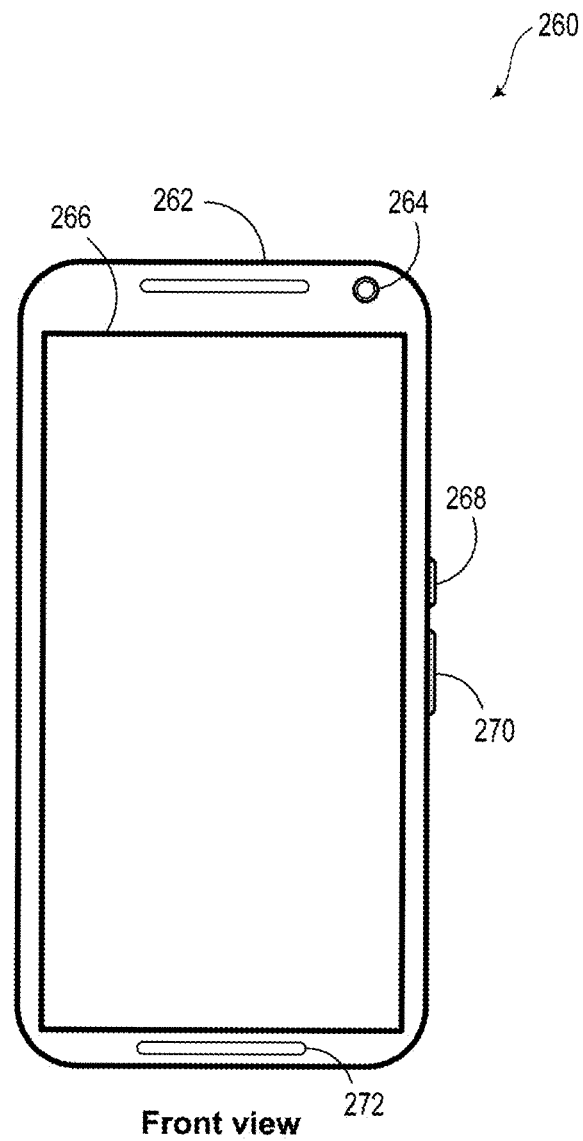
FIG. 2D illustrates a computing device, according to example implementations.

FIG. 2D illustrates a computing device 260, according to an example implementation. The computing device 260 may be, for example, a mobile phone, a smartphone, a tablet computer, or a wearable computing device. However, other implementations are possible. In an example implementation, computing device 260 may include some or all of the elements of system 100 as illustrated and described in relation to FIG. 1.

Computing device 260 may include various elements, such as a body 262, a camera 264, a multi-element display 266, a first button 268, a second button 270, and a microphone 272. The camera 264 may be positioned on a side of body 262 typically facing a user while in operation, or on the same side as multi-element display 266. Other arrangements of the various elements of computing device 260 are possible.

The microphone 272 may be operable to detect audio signals from an environment near the computing device 260. For example, microphone 272 may be operable to detect voices and/or whether a user of computing device 260 is in a conversation with another party.

Multi-element display 266 could represent a LED display, an LCD, a plasma display, or any other type of visual or graphic display. Multi-element display 266 may also support touchscreen and/or presence-sensitive functions that may be able to adjust the settings and/or configuration of any aspect of computing device 260.

In an example implementation, computing device 260 may be operable to display information indicative of various aspects of audio signals being provided to a user. For example, the computing device 260 may display, via the multi-element display 266, a current audio playback configuration.

III. Example Servers

Figure 3:
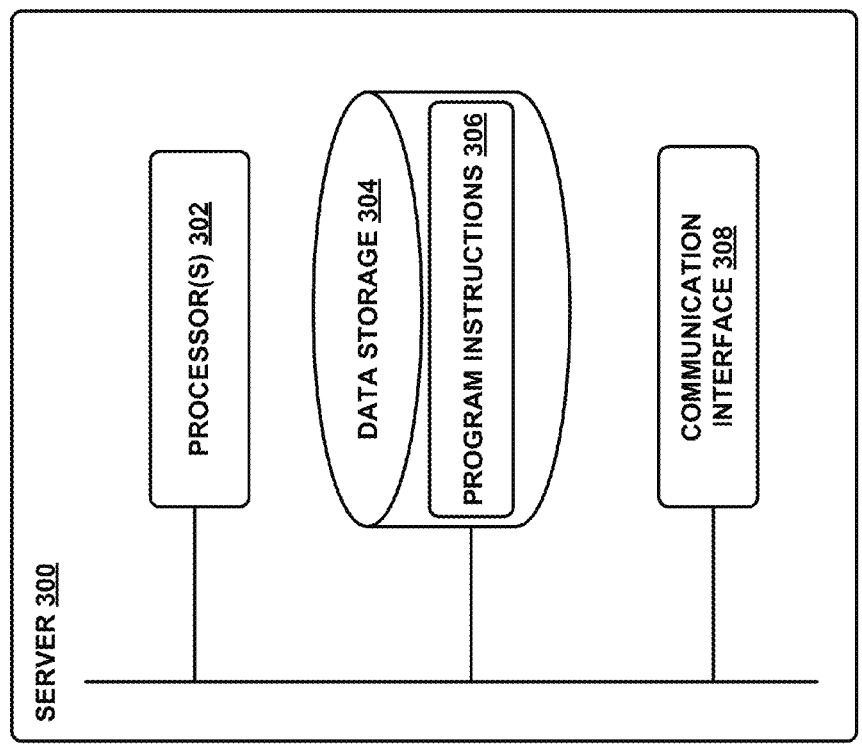
FIG. 3 illustrates a schematic diagram of a server, according to an example implementation.

FIG. 3 illustrates a schematic diagram of a server 300, according to an example implementation. The server 300 includes one or more processor(s) 302 and data storage 304 (could also be referred to as a memory 304), such as a non-transitory computer readable medium. Additionally, the data storage 304 is shown as storing program instruction 306, which may be executable by the processor(s) 302. Further, the server 300 also includes a communication interface 308. Note that the various components of serve 300 may be arranged and connected in any manner.

Yet further, the above description of processor(s) 152, memory 154, and communication interface 130, may apply to any discussion below relating to the respective component being used in another system or arrangements. For instance, as noted, FIG. 3 illustrates processors, data storage, and a communication interface as being incorporated in another arrangement. These components at issue may thus take on the same or similar characteristics (and/or form) as the respective components discussed above in association with FIG. 1. However, the components at issue could also take on other characteristics (and/or form) without departing from the scope of the disclosure.

In practice, a server may be any program and/or device that provides functionality for other programs and/or devices (e.g., any of the above-described devices), which could be referred to as "clients". Generally, this arrangement may be referred to as a client-server model. With this arrangement, a server can provides various services, such as data and/or resource sharing with a client and/or carrying out computations for a client, among others. Moreover, a single server can provide services for one or more clients and a single client can receive services from one or more servers. As such, servers could take various forms (currently known or developed in the future), such as a database server, a file server, a web server, and/or an application server, among other possibilities.

Generally, a client and a server may interact with one another in various ways. In particular, a client may send a request or an instruction or the like to the server. Based on that request or instruction, the server may perform one or more operations and may then respond to the client with a result or with an acknowledgement or the like. In some cases, a server may send a request or an instruction or the like to the client. Based on that request or instruction, the client may perform one or more operations and may then respond to the server with a result or with an acknowledgement or the like. In either case, such communications between a client and a server may occur via a wired connection or via a wireless connection, such as via a network for instance.

IV. Example Client-Server Arrangement

Figure 4:
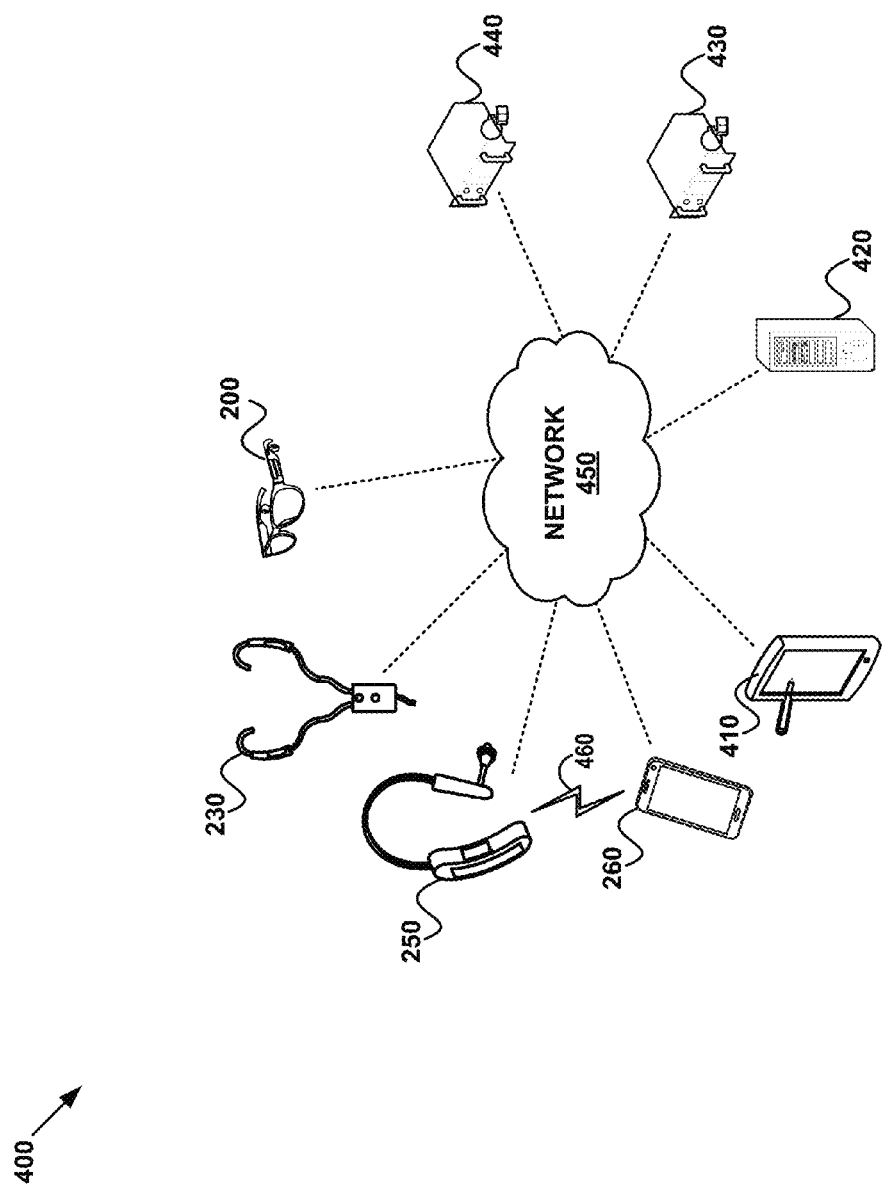
FIG. 4 illustrates a simplified block diagram of a client-server arrangement, according to an example implementation.

FIG. 4 is a simplified block diagram of a client-server arrangement 400, in which the various implementations described herein can be employed. Arrangement 400 may include any of the above-described devices 200, 230, 250, and 260, and may also include other devices, such as example computing device 410 for instance. Additionally, arrangement 400 may include servers 420, 430, and 440, which are each further described in more detail below. In an example implementation, the arrangement 400 could include a greater number of devices than the number of devices illustrated in FIG. 4 or could include a fewer number of devices than the number of devices illustrated in FIG. 4. Similarly, the arrangement 400 could include a greater number of server than the number of server illustrated in FIG. 4 or could include a fewer number of server than the number of servers illustrated in FIG. 4.

In practice, each of these devices and servers may be able to communicate with one another via a network 450 through the use of wireline and/or wireless connections (represented by dashed lines). Network 450 may be, for example, the Internet, or some other form of public or private Internet Protocol (IP) network. Thus, the various devices and servers can communicate with one another using packet-switching technologies. Nonetheless, network 450 may also incorporate at least some circuit-switching technologies, and the devices and servers may communicate via circuit switching alternatively or in addition to packet switching. Moreover, network 450 may also be a local network. The local network may include wireline (e.g., Ethernet) and wireless connections (e.g, Wi-Fi). Yet further, network 450 could also include a radio access network or access point. Accordingly, the connections between the various devices and servers may take the form of or include a wireless interface such as a Wifi, BLUETOOTH®, or wide-area wireless interface (e.g., WiMAX or 3GPP Long-Term Evolution (LTE)).

In some situations, some devices may not necessarily communicate directly via the network 450 and could instead communicate via other devices. In particular, a first device may establish a communication link (e.g., wired or wireless) with a second device and could then engage in communication over the network 450 via the communication link established with the second device. For example, wearable device 250 is shown as having established a communication link 460 with computing device 260. In this way, the device 250 could communicate over the network 450 via device 260. Of course, communication approaches could be established between any feasible combination of device (e.g., any one of device 230 and/or 200 could also each establish a respective communication link with device 260, so as to then engage in indirect communications over the network 450). Other situations are also possible.

Further, as noted, arrangement 400 may include a server 420. In an example implementation, the server 420 may be configured to carry out operations that help provide functionality of the disclosed platform. Also, a device (e.g., any one of those shown in FIG. 4) may have stored thereon an application program (hereinafter "companion application") that is executable by the device's processors to provide functionality of the disclosed platform. In practice, the companion application could be downloadable onto the device at issue (e.g., via network 450), could be installable onto the device at issue (e.g., via a CD-ROM), and/or could be configured onto the device at issue in other ways (e.g., via manual engineering input). So with this implementation, the device and the server 420 may communicate to collectively provide functionality of the platform via companion application.

Moreover, the server 420 may have stored thereon or may otherwise have access to a user-account database. The user-account database may include data for a number of user-accounts, and which are each associated with one or more users. For a given user-account, the user-account database may include data related to or useful in providing services via the companion application. Typically, the user data associated with each user-account is optionally provided by an associated user and/or is collected with the associated user's permission. Further, in some implementations, a user may have to register for a user-account with the server 420 in order to use or be provided with these services via the companion application. As such, the user-account database may include authorization information for a given user-account (e.g., a user-name and password), and/or other information that may be used to authorize access to a user-account.

In this regard, a user may associate one or more of their devices (e.g., each having the companion application) with their user-account, such that they can be provided with access to the services via the companion application on the respective device. For example, when a person uses an associated device to, e.g., select certain content as described below, the associated device may be identified via a unique device identification number, and the content selection may then be attributed to the associated user-account. For sake of simplicity, a particular user-account that corresponds to one or more devices and that is stored on server 420 will be referred to hereinafter as an application-program account. Other examples are also possible.

Furthermore, as noted, arrangement 400 may also include servers 430 and 440. In particular, server 430 may store audio content and may provide a "third-party" audio service (hereinafter first audio-provider service), such as by streaming audio content stored at the server 430 to client devices (e.g., to any one of the devices 200, 230, 250, 260, and/or 410). Thus, the server 430 may also be referred to as an audio-provider server 430.

With this implementation, a device (e.g., any one of those shown in FIG. 4) may have stored thereon an application program (hereinafter "first third-party application") that is executable by the device's processors to provide functionality of the first audio-provider service. In practice, the first third-party application could be downloadable onto the device at issue, could be installable onto the device at issue, and/or could be configured onto the device at issue in other. So with this implementation, the device and the server 430 may communicate to collectively provide functionality of the first audio-provider service via the first third-party application.

Moreover, in some cases, the server 430 may also have a user-account database and thus a user may associate one or more of their devices (e.g., each having the first third-party application) with a user-account, such that they can be provided with access to the first audio-provider service via the first third-party application on the respective device. For sake of simplicity, a particular user-account that corresponds to one or more devices and that is stored on server 430 will be referred to hereinafter as a first audio-provider account.

Similarly, server 440 may store audio content (e.g., possibly different than that stored by server 430) and may provide a "third-party" audio service (hereinafter second audio-provider service), such as by streaming audio content stored at the server 440 to client devices (e.g., to any one of the devices 200, 230, 250, 260, and/or 410). Thus, the server 440 may also be referred to as an audio-provider server 440.

With this implementation, a device (e.g., any one of those shown in FIG. 4) may have stored thereon an application program (hereinafter "second third-party application") that is executable by the device's processors to provide functionality of the second audio-provider service. In practice, the second third-party application could be downloadable onto the device at issue, could be installable onto the device at issue, and/or could be configured onto the device at issue in other. So with this implementation, the device and the server 440 may communicate to collectively provide functionality of the second audio-provider service via the second third-party application.

Moreover, in some cases, the server 440 may also have a user-account database and thus a user may associate one or more of their devices (e.g., each having the first third-party application) with a user-account, such that they can be provided with access to the second audio-provider service via the second third-party application on the respective device. For sake of simplicity, a particular user-account that corresponds to one or more devices and that is stored on server 440 will be referred to hereinafter as a second audio-provider account.

In such implementations, any one of a user's one or more devices may include (e.g., be installed with) any one of the companion application, first third-party application, and/or second third-party application, among other possible applications. In this manner, any one of a user's one or more devices could communicate with respective servers (e.g., servers 420, 430, and/or 440) to help respectively provide functionality of the first audio-provider service, the second audio-provider service, and/or the platform disclosed herein.

IV. Example Platform for Creation and Control of Channels

Disclosed herein is a platform for creation and control of channels. In particular, a channel may be a shortcut (a "link") to start playing certain audio content, such as to audio content provided by a third-party service or to audio content stored locally on a device, among other possibilities. In practice, a channel may provide a shortcut to audio content of any feasible form. For example, a channel may provide a shortcut to: a radio broadcast, a playlist including one or more audio tracks, an album including one or more tracks, an artist's discography, an audio book, a live audio stream, a third-party audio-provider application, and/or an account associated with a "third-party" audio-provider application, among other possibilities. As such, a channel could be considered to be a stream of audio that has some unifying theme.

According to an example implementation, the disclosed functionality of creation and control of channels could be arranged in various ways. In particular, developers of audio-provider applications could respectively implement as part of audio-provider services (or have audio-provider services communicate with) a particular application programming interface (API) that the companion application at issue also interfaces with. In this way, audio-provider servers (e.g., audio-provider servers 430 and/or 440) could each provide audio sources and/or other data to the server 420 based on that API. In practice, an audio source may specify information related to accessing certain audio content, such as by specifying an identifier of the content, authentication related to accessing the content, and/or communication information for establishing transmission of that content to a device, among other options. Further, the other data at issue may include metadata specifying information about the audio content, such as by specifying: a name of the audio-provider service, a name of a playlist, a name of an artist, a name of a track, a name of an audio book, duration of a playlist, duration of a track, duration of an audio book, and/or a type of content (e.g., music vs. audio book), among other feasible forms of information. Moreover, based on the API, audio-provider servers may also be able to interpret any information received from the server 420 and/or from computing devices executing the companion application.

With this implementation, a user may use the disclosed platform by interacting with the above-mentioned companion application and/or with other ones of the above-mentioned third-party applications. Through these interactions, a user could create or otherwise configure various "favorite" channels each providing a shortcut to certain audio content. Once such channels are created, the user may then use various intuitive gestures to transition between these channels and perhaps also between content (e.g., audio tracks) within such channels.

In practice, a user could use the disclosed platform on any device, such on any one of the above-mentioned devices. In particular, if a certain device has a visual display (e.g., device 260), then the companion application on that device could provide a graphical user interface (GUI) through which the user may carry out interactions to use the platform. Whereas, if a certain device does not have a visual display (e.g., any of the "screenless" wearable devices 200, 230, and/or 250), then the companion application could provide audible notifications, audible commands, and/or haptic feedback (e.g., vibrations or other mechanical output) or the like, so as to help the user carry out interactions to make use of the platform. As such, the disclosed platform could help a user of a screenless wearable device access and transition between audio content from various sources and do so without necessarily having to navigate through a hierarchy of applications (and/or local storage) on a device that does not have a visual display. The disclosed platform is described below in more detail.

A. Providing Gestures on Various Devices

In an example implementation, a computing device may have at least one input device operable to receive input data associated with the application-program account, which corresponds to the computing device. In one example, an input device may be a microphone, such microphone 226 on device 20, microphone 242 on device 230, microphone 256 on device 250, or microphone 272 on device 260. In another example, an input device may be a touch-based interface, such as the touch pad 224 on device 200, the touch pad on the behind-ear housing 236 of device 230 (not shown), the touch-sensitive surface 254 on device 250, or the touch-screen on display 266 of device 260. In yet another example, an input device may be a mechanical interface, such as buttons 268 and 270 on device 260. In yet another example, an input device may be an inertial measurement unit (IMU), which could register a gesture such as a tap.

Figure 5A:
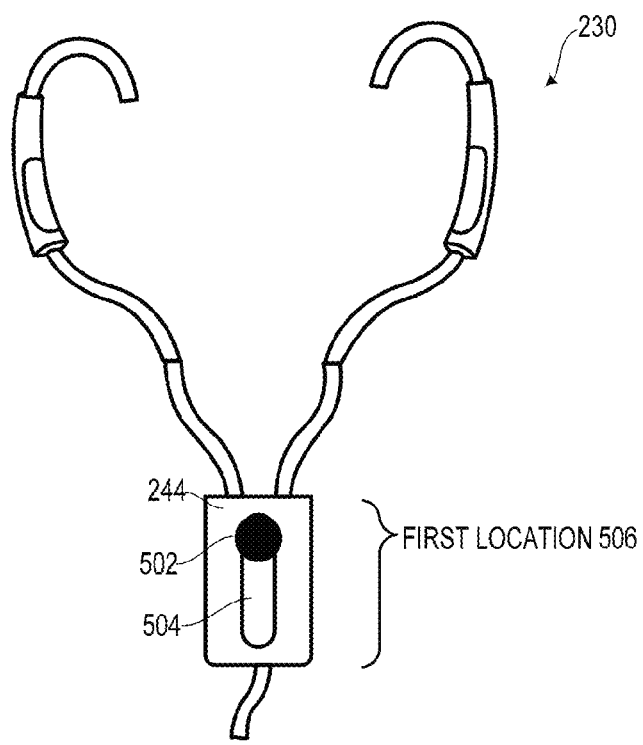
FIG. 5A to 5B illustrate a mechanical interface, according to an example implementation.
Figure 5B:
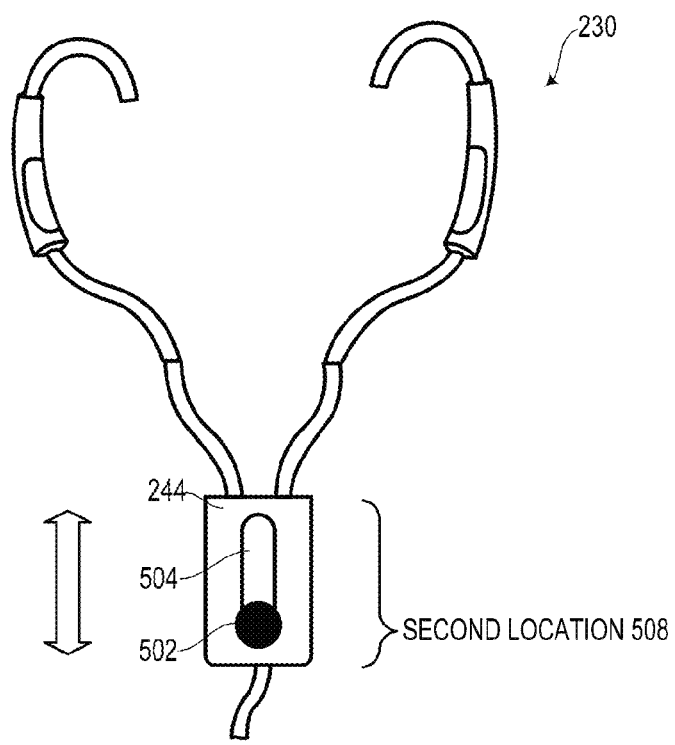

While not shown in FIGS. 2A to 2C, a screenless wearable device may also have at least one mechanical interface. For example, FIGS. 5A to 5B illustrate a mechanical interface incorporated onto the housing 244 of device 230. In particular, that mechanical interface takes the form of a "slider" mechanism including a shaft 502 that is configured to move along a track 504, such as from a first location 506 as shown in FIG. 5A to a second location 508 as shown in FIG. 5B. Further, the "slider" mechanism could include a spring (not shown) that causes the shaft 502 to move back to the first location 506 when the shaft 502 is not being actuated (e.g., by a user). Furthermore, the "slider" mechanism could include an electro-mechanical interface (e.g., a resistive element) that translates mechanical movement of the shaft into corresponding electrical signals representative of such movement, thereby resulting in an input device operable to receive input data corresponding to mechanical input. Other mechanical interfaces are possible as well.

Given these various input devices incorporated within various computing devices, a user could provide various gestures. In particular, a gesture may be any action taken by a user to cause input data to be generated by an input device. In one case, a gesture may involve a user providing voice commands via a microphone, thereby causing the microphone to generate input data corresponding to those voice commands. In another case, a gesture may involve a user carrying out touch interactions on a touch-based interface, thereby causing the touch-based interface to generate input data corresponding to touch interactions. For example, a user may carry out a "swipe" gesture that causes the touch-based interface to generate touch data based on movement (e.g., of at least one finger) from one location to another along the touch-based interface. In another example, a user may carry out a "tap" gesture involving the touch-based interface generating touch data based on an interaction (e.g., of at least one finger) with an area of the touch-based interface for a threshold low duration.

In yet another case, a gesture may involve a user carrying out mechanical interactions on a mechanical interface, thereby causing the mechanical interface to generate input data corresponding to those mechanical interactions. For example, a user may press a button so as to provide mechanical input. In another example, a "slide" gesture of the above-mentioned slider may involve the shaft 502 moving from a first location to a second location based on actuation by a user, thereby causing the slider to generate input data based on that movement. In yet another example, a "slide and hold" gesture of the above-mentioned slider may involve the shaft 502 moving from a first location to a second location followed by maintenance of the shaft 502 at the second location for at least a threshold duration, thereby causing the slider to generate input data based on that movement and the maintenance that follows. Other cases and example are also possible.

With this implementation, a computing device and/or the server 420 may determine operations to carry out based on evaluation of received input data. In one case, the computing device may not interact with the server 420 as part of this evaluation. In particular, the computing device may thus simply receive input data and may determine that the input data corresponds to a particular gesture. Then, the computing device may determine particular operations to carry out based on that input data corresponding to the particular gesture, and the computing device may then carry out those determined operations.

In another case, the computing device may receive input data and may send that input data to the server 420, so that the server 420 then evaluates the input data. In particular, the server 420 may determine that the input data corresponds to a particular gesture and may then use that determination as basis for determining particular operations that should be carried by the computing device. As such, the server 420 may then send to the computing device an instruction specifying those determined particular operations and/or the determined particular gesture, among other information. Once the computing device receives that instruction, the computing device may then responsively carry out the particular operations. Other cases are also possible.

In practice, the computing device and/or the server 420 may use various approaches to determine operations to carry out. For instance, the computing device and/or the server 420 may have stored thereon or may otherwise have access to mapping data. That mapping data may map each of various characteristics of received input data respectively to at least one operation. In practice, these characteristics may be: the gesture corresponding to the input data, the particular input device through which the input data is received, the particular computing device including the particular input device through which the input data is received, the particular application program (e.g., companion application or "third-party" audio-provider application) being interfaced with at the time of the gesture, and/or the particular audio content being streamed at the time of the gesture, among others. As such, when input data is received, the computing device and/or the server 420 may determine characteristics of the input data and may then use the mapping data to determine the operations to carry out. In practice, these operations may take various forms and may involve (without limitation): addition of channels, removal of channels, transitions between channels, transitions between audio tracks, and/or output of audible announcements, among other possibilities.

B. Addition of Channels

In an example implementation, the computing device may determine that received input data includes a request to add a channel (hereinafter channel-addition request). In practice, that channel-addition request may indicate content (e.g., a particular playlist) from a particular audio-provider service. In response to the channel-addition request, the computing device may send to the server 420 an instruction to establish a channel that provides access to that content via the application-program account that corresponds with the computing device. In this way, the server 420 may essentially receive the channel-addition request through this instruction and may then respond to receiving the channel-addition request by establishing the channel.

In particular, the server 420 may establish the channel in one of various ways. For example, the server 420 may engage in a communication session with the audio-provider server (e.g., audio-provider server 430) that is associated with the audio-provider service providing the content. In doing so, the server 420 may receive from the audio-provider server an identifier of the content, authentication information that permits computing device(s) associated with the application-program account to access to the content via the application-program account, and/or communication information for establishing transmission of the content to computing device(s) associated with the application-program account, among other options. Additionally or alternatively, the server 420 may send to the audio-provider server an identifier of the application-program account, respective identifier(s) of computing device(s) associated with the application-program account, and/or communication information for establishing a communication session with computing device(s) associated with the application-program account, among other options. After such exchange of information, establishment of the channel is completed and a user may then access the content from the audio-provider service through the companion application on the user's computing device, which is associated with the application-program account as discussed above. Other examples are also possible.

Given this implementation, a user may add any feasible number of channels and these various channels may respectively provide access to content from various audio-provider services. For instance, the computing device may receive a first channel-addition request indicating content (e.g., a particular audio broadcast) from the above-mentioned first audio-provider service, and the computing device may then coordinate with the server 420 to establish a first channel that provides access to that content from the first audio-provider service. Subsequently, the computing device may receive a second channel-addition request indicating content (e.g., a particular album) from the above-mentioned second audio-provider service, and the computing device may then coordinate with the server 420 to establish a second channel that provides access to that content from the second audio-provider service.

In another aspect, the disclosed platform may also allow for addition of at least one channel that provides a shortcut to content that is stored locally on a computing device, so that a user interacting with the companion application on that computing device could also access that content through the companion application. In this aspect, the computing device may receive a channel-addition request indicating content (e.g., a particular album) stored in data storage (e.g., memory 154) of the computing device. In response to that channel-addition request, the computing device may send to the server 420 an instruction to establish a channel that provides access to that locally stored content via the application-program account.

In particular, the server 420 may establish such a channel in various ways. By way of example, the server 420 may obtain information related to a location within the computing device's data storage at which the content is stored. For instance, that location may be specified as a directory within a file system of a file containing the content, among other possibilities. In practice, the server 420 may obtain that information as part of the channel-addition request or at other times. Nonetheless, once the server 420 obtains the information, the server 420 may establish the channel by associating the obtained information with the application-program account. Once the channel is established, a user may then access the locally stored content through the companion application on the user's computing device, which is associated with the application-program account as discussed above. Other examples are also possible.

Regardless of whether an added channel provides access to locally stored content or whether an added channel provides access to content from an audio-provider service, the server 420 may from time-to-time (e.g., continuously or periodically) update content associated with an added channel, so as to "refresh" the added channel. For example, an audio-provider service may carry out updates to certain content associated with a channel, such as by reorganizing, removing, and/or adding audio tracks within a playlist that has been added as a channel, among other possibilities. In this example, the server 420 may determine that such updates have occurred and may responsively update the channel associated with the application-program account, so that, once that channel is selected as described below, the computing device is set to output updated content within that channel. Other examples are also possible.

In an example implementation, various types of gestures on various types of computing devices may be used to carry out addition of a channel. In particular, the computing device and/or the server 420 may be configured to determine that input data is indicative of one or more particular gestures representative of channel addition. In practice, these gestures could take on any feasible form and each computing device may have associated gestures specific to that computing device, which may depend on the particular input device(s) included in that computing device. So given these various possible gestures, various approaches are possible for carrying out channel addition. Example approaches are described in more detail below.

In one case, channel addition may be carried out through a search function on the companion application. In particular, as noted, the server 420 may receive or otherwise have access to metadata specifying information about audio content from various audio-provider services. With this arrangement, the computing device may receive a search query (e.g., provided by a user) through an input device of the computing device. That search query may specify information related to desired audio content, such as a genre name, an artist name, an audio book name, and/or an audio book category, among various other examples. Once received, the computing device may send that search query to the server 420 and the server 420 may then use the metadata as basis for determining matching results. In particular, the server 420 determine metadata specifying information that matches information specified in the search query, such as by matching a sequence of letters, numbers, and/or characters specified in the query for instance. Then, the server 420 may inform the computing device of audio content associated with the matching metadata, so that the computing device could then output an indication of that audio content. In this way, a search query provided by a user may yield search results specifying through the companion application various content from various audio-provider services.

Figure 6:
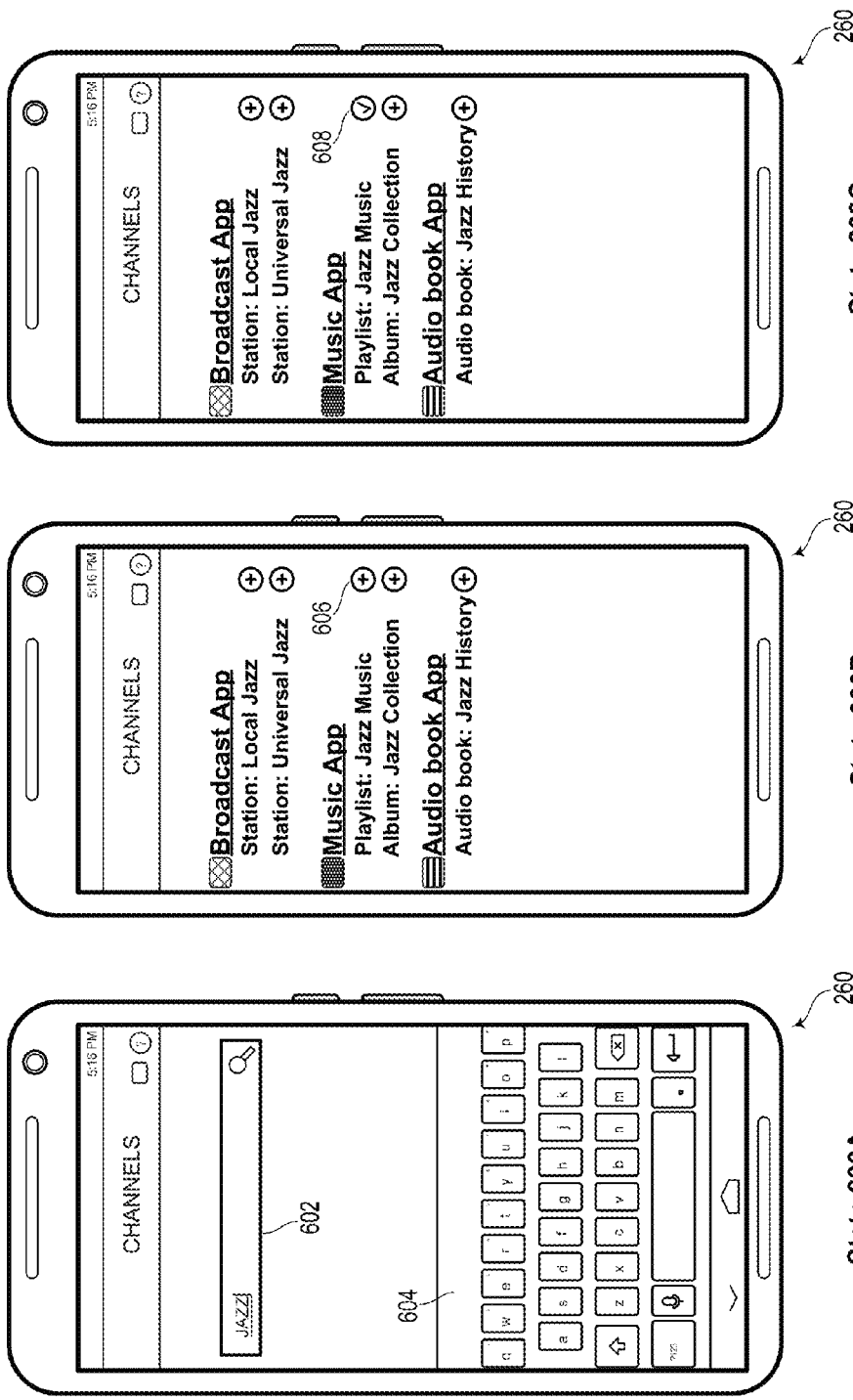
FIGS. 6 to 9 illustrate approaches for channel addition, according to an example implementation.

FIG. 6 illustrates an example channel addition through a search function on the companion application. In particular, FIG. 6 shows a first state 600A of a GUI being displayed on the display 266 of computing device 260. As shown, the GUI includes a search bar 602 and a keyboard 604. With this arrangement, a user may provide input (e.g. "jazz") into the search bar 602 through the keyboard 604 and may also initiate the search through the keyboard. After the server 420 determines the search results, the search results may be displayed as part of the GUI as shown in the second screen state 600A. As shown, the results display various types of content from various audio-provider services. For instance, the results indicate that (i) a broadcast application provides content such as a "local jazz station" and a "universal jazz station", (ii) a music application provides content such as a "jazz music playlist" and a "jazz collection album", and (iii) an audio book application provides content such as a "jazz history." Furthermore, an icon 606 is shown next to each content option, with that icon 606 being representative of a request to add the respective content (e.g., taking the form of a "plus" sign). As such, FIG. 6 shows a third screen state 600C indicating that a user has selected to add the "jazz music playlist" as a channel, with that addition specifically indicated as the icon 606 transforming into a different icon 608 indicative of that addition (e.g., taking the form of a "checkmark"). Other illustrations are also possible.

In another case, channel addition may be carried out by browsing through a hierarchy of audio-provider services on the companion application. In particular, through the companion application, the computing device may output (e.g., on a display or through audible notifications) information specifying one or more audio-provider services, such as those corresponding to third-party applications also found on the computing device. With this arrangement, the computing device may then receive input data indicative of selection of one or of the specified audio-provider services and may responsively output information (e.g., on a display or through audible notifications) indicative of a catalogue of content available through that audio-provider service. Then, the computing device may receive further input data indicative of requests to navigate to certain parts of the catalogue and/or indicative of a request to add certain content within the catalogue as a channel on the companion application.

Upon that request, the computing device may coordinate with the server 420 to establish a channel providing access to that content.

Figure 7:
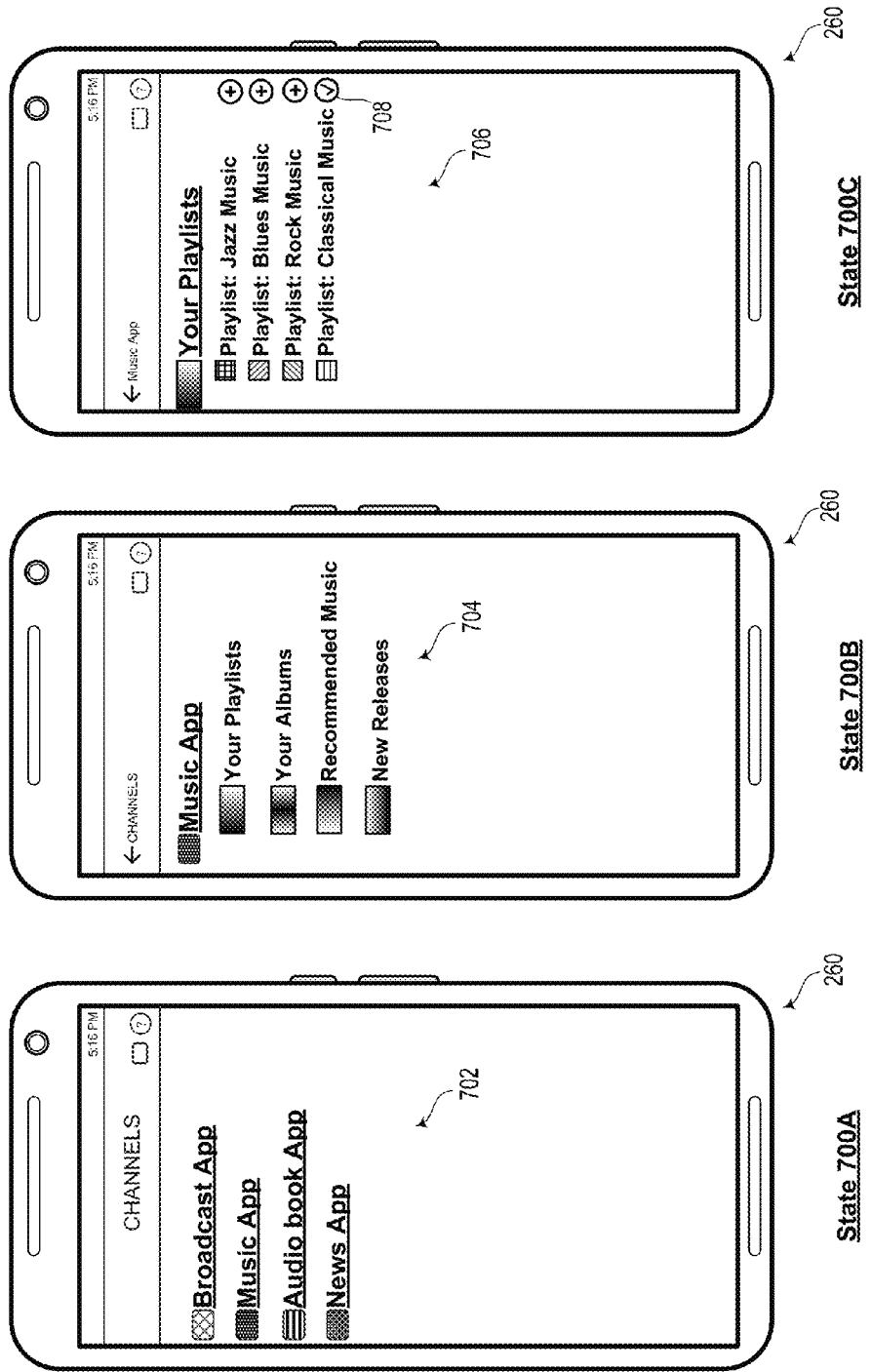

FIG. 7 illustrates an example channel addition by browsing through a hierarchy of audio-provider services on the companion application. In particular, FIG. 7 shows a first state 700A of a GUI being displayed on the display 266 of computing device 260. As shown, the GUI includes listing 702 of audio-provider services corresponding to third-party applications also found on the computing device 260 (e.g., "broadcast app", "music app", "audio book app", and "news app"). In an example scenario, a user may provide input to select the "music app" and the GUI may then transition to a second screen state 700B. As shown, screen state 700B of GUI includes a catalogue 704 indicative of content categories of the "music app", which include "your playlists", "your albums", "recommended music", and "new releases." In this example scenario, the user may provide further input to selection the "your playlists" categories and the GUI may then transition to a third screen state 700C. As shown, screen state 700C of GUI includes a playlist listing 706 illustrative of music playlists associated with the user's account on the "music app". Moreover, the screen state 700C includes icons each representative of a request to add a respective playlist (e.g., each taking the form of a "plus" sign). As such, the user may provide further input data indicative of an addition of one of these playlists as a channel on the companion application. As illustrated by the icon 708 (e.g., taking the form of a "checkmark"), the user has added the "classical music" playlist as a channel. Other illustrations are possible as well.

In yet another case, channel addition may be carried out through interaction with an audio-provider service rather than directly through the companion application. In particular, through a third-party application associated with the audio-provider service, the computing device may output (e.g., on a display or through audible notifications) information indicative of a catalogue of content available through that audio-provider service. Then, the computing device may receive further input data indicative of requests to navigate to certain parts of the catalogue and/or indicative of a request to add certain content within the catalogue as a channel on the companion application. Upon that request, the computing device may coordinate with the server 420 to establish a channel providing access to that content.

Figure 8:
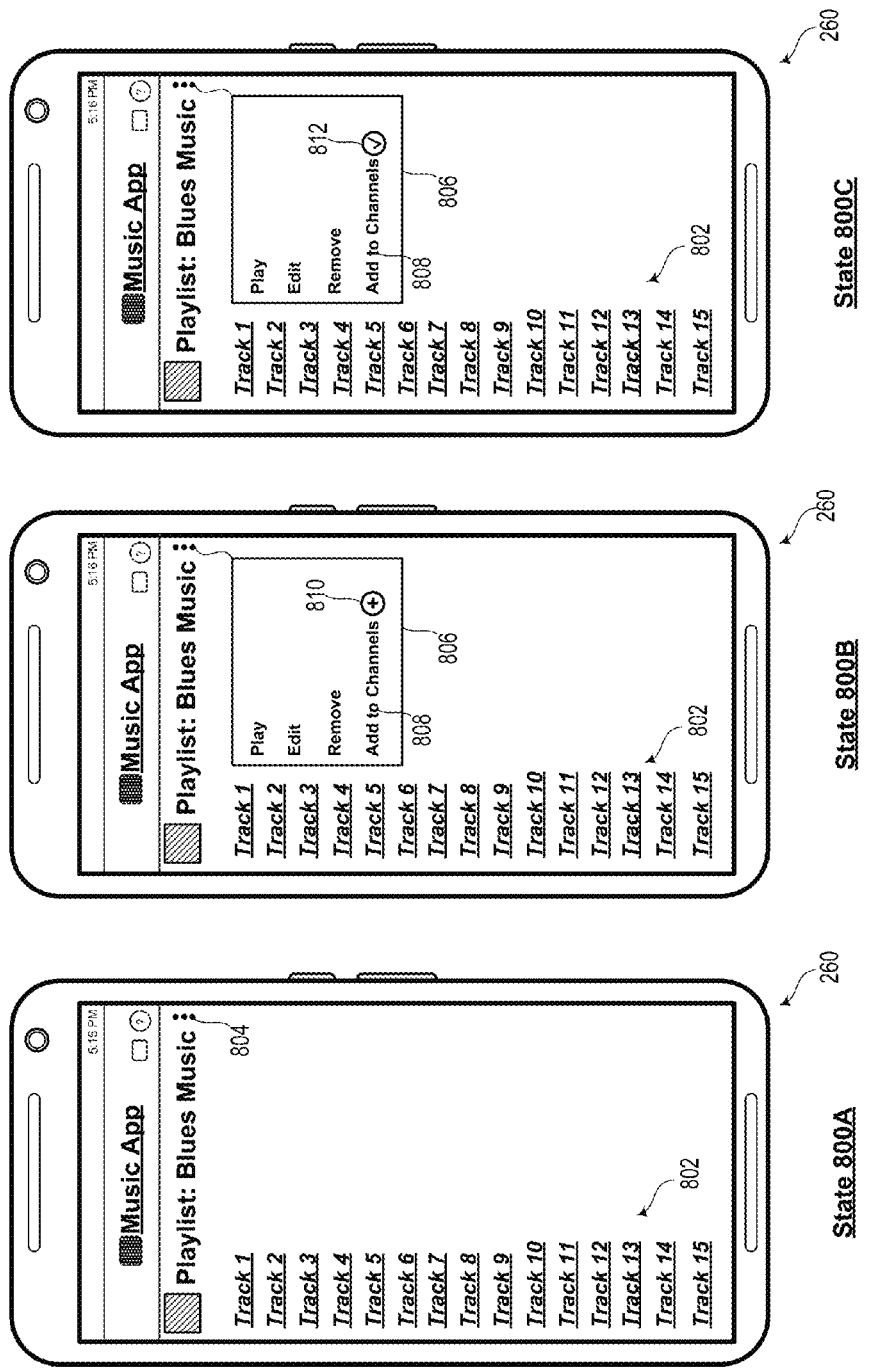

FIG. 8 illustrates an example channel addition carried out through interaction with an audio-provider service. In particular, FIG. 8 shows a first state 800A of a GUI of the "music app" being displayed on the display 266 of computing device 260. As shown, the GUI includes a listing 802 of audio tracks within a "blues music" playlist accessible via the "music app." Also, the GUI includes an icon 804 representative accessibility to further options related to the "blues music" playlist. With this arrangement, a user may provide input indicative of selection of that icon 804 and the GUI may then transition to a second screen state 800B. As shown, screen state 800B of GUI includes a menu 806 listing several menu item, one of which is a menu item 808 specifying an option to add the "blues music" playlist as a channel on the companion application. Moreover, screen state 800B of GUI also includes an icon 810 next to the menu item 808 with that icon 810 being representative of a request to add the respective content (e.g., taking the form of a "plus" sign). As such, FIG. 8 shows a third screen state 800C indicating that a user has selected to add the "blues music" playlist as a channel, with that addition specifically indicated as the icon 810 transforming into a different icon 812 indicative of that addition (e.g., taking the form of a "checkmark"). Other illustrations are also possible.

In yet another case, channel addition may be carried out through an interaction with the computing device while the computing device is outputting (e.g., through audio output device 110) content that has not yet been added as a channel. In particular, the computing device may receive input data indicative of a selection to output content provided by an audio-provider service. Then, while that content is being outputted, the computing device may receive further input data indicative of particular gesture that represents a request to add that content as a channel. By way of example (and without limitation), that particular gesture may involve a press of a button on the computing device for at least a threshold duration. Nonetheless, once the computing device receives the input data indicative of the particular gesture, the computing device may then coordinate with the server 420 to establish a channel providing access to the content being outputted. In this manner, a user may be able to quickly add playing content as a channel on the companion application. Other cases and examples are possible as well.

Figure 9:
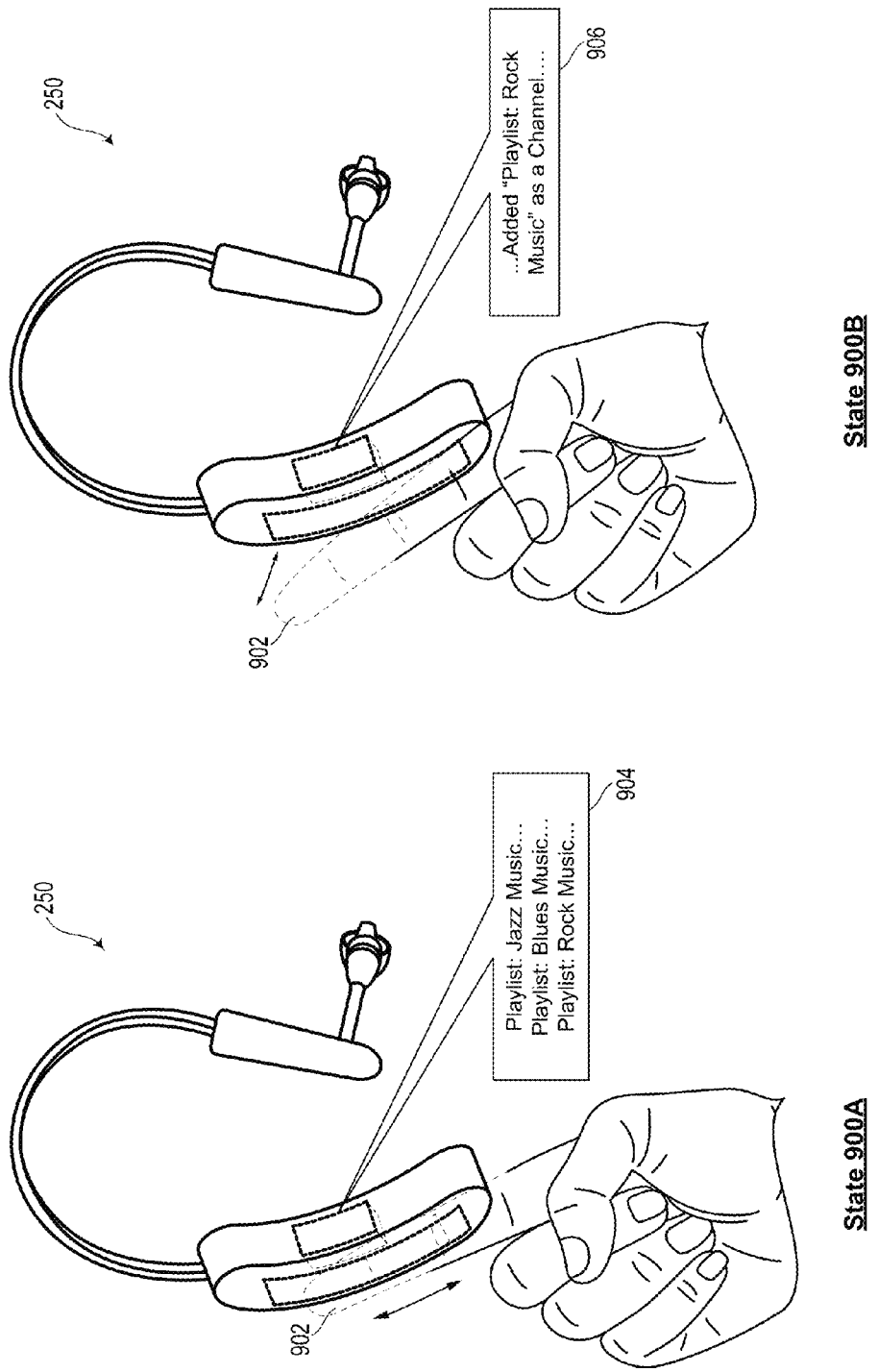

While the various channel addition approaches are illustrated in FIGS. 6 to 8 as being carried out on a computing device having a display (e.g., device 260), any of the above-described channel addition approaches could also be carried out on any screenless wearable device (e.g., any one of devices 200, 230, and 250). For instance, FIG. 9 illustrates gestures being provided on the wearable device 250 so as to ultimately add a channel through direct interaction with that device 250 despite that device not having a display. In an example scenario, a user may carry out channel addition by browsing through a hierarchy of audio-provider services on the companion application.

In particular, state 900A of the device 250 illustrate that the user's finger 902 is providing the above-mentioned "swipe" gestures onto the touch-sensitive surface 254 so as to navigate through playlists on the "music app". After each "swipe" gesture is detected, the device 250 outputs via a BCT of the device 250 an audible notification indicative of a particular playlist. For instance, FIG. 9 illustrate three such audible notifications 904 that include a notification of the "jazz music" playlist followed by a notification of the "blues music" playlist" and then followed by a notification of the "rock music" playlist. Once the user hears a notification of a playlist of interest, the user could then add that playlist as a channel by providing another gesture. For instance, state 900B of the device 250 illustrate that the user's finger 902 is providing the above-mentioned "tap" gesture onto the touch-sensitive surface 254 so as to request addition of the "rock music" playlist as a channel on the companion application. And upon receiving that request, the device 250 may coordinate with the server 420 to establish a channel providing access to the "rock music" playlist. Moreover, upon establishment of that channel, the device 250 may responsively output via the BCT another audible notification 906 indicating that the "rock music" playlist has been added as a channel. Other examples and illustrations are also possible.

C. Navigation Between Channels

In an example implementation, the computing device may determine a selection of an added channel and may responsively cause content associated with that channel to be outputted by an audio output device of the computing device. In particular, the computing device may receive input data and may determine that the received input data corresponds to a particular gesture indicative of the selection. Responsively, the computing device may then output the selected content. In some implementations, the computing device may coordinate with the server 420 to determine the selection. In particular, once the computing device receives the input data, the server 420 may then receive that input data from the computing device. And once the input data is received by the server 420, the server 420 may then determine that the received input data corresponds to the particular gesture indicative of the selection and may responsively send to the computing device an instruction to output the content.

In some situations, a selection of an added channel may be a request to begin output content associate with that channel, such as when no other channel is currently selected for instance. In other situations, such as when another channel has already been selected (and perhaps content associated with that channel is being outputted), a selection of an added channel may be a transition from the previously selected channel to that newly selected channel. Other situations are possible as well.

By way of example, the computing device may determine a first selection of the above-mentioned first channel that provides access to content from the first audio-provider service. Responsively, the computing device may then cause associated content from the first audio-provider service to be output by the audio output device of the computing device. Then, the computing device may determine a second selection of the above-mentioned second channel that provides access to content from the second audio-provider service. In practice, that second selection may involve a transition from the first channel to the second channel. Nonetheless, in response to determining the second selection, the computing device may responsively cause associated content from the second audio-provider service to be output by the audio output device of the computing device, which may specifically involve outputting the associated content from the second audio-provider service instead of outputting associated content from the first audio-provider service. Other examples are also possible.

Furthermore, when the server 420 sends to the computing device an instruction to output content, that instruction may specifically include an instruction to stream the content from a respective audio-provider server. In practice, streaming content may be defined as the process of constantly delivering content from a server to a computing device and presenting that delivered content via the computing device on an ongoing basis. As such, upon determining the above-mentioned first selection, the server 420 may send to the computing device a first instruction to stream content from the first audio-provider server and to output (e.g., via an audio output device) that content that is being streamed. Similarly, upon determining the above-mentioned second selection, the server 420 may send to the computing device a second instruction to stream content from the second audio-provider server and to output (e.g., via an audio output device) that content that is being streamed. Other examples are also possible.

Moreover, these various channel selections may occur through the companion application and thus without the user having to navigate through various third-party applications and/or a file system of the computing device in order to listen to desired content. In particular, when the computing device executes operations related to the companion application, the computing device may engage in a direct communication session with the application-program account stored at the server 440. In particular, the computing device may do so in order to obtain information associated with the application-program account on an as-needed basis, such as information related to channels that have already been established for that application-program account and/or information related to content associated with those channels, among other possibilities. As such, any channel selection may be carried out during the direct communication session, thereby allowing a user to play content from various third-party applications through the companion application.

Given these implementations, various types of gestures on various types of computing devices may be used to carry out selection of a channel. In particular, the computing device and/or the server 420 may be configured to determine that input data is indicative of one or more particular gestures representative of channel selection. In practice, these gestures could take on any feasible form and each computing device may have associated gestures specific to that computing device, which may depend on the particular input device(s) included in that computing device. So given these various possible gestures, various approaches are possible for carrying out channel selection.

In particular, determining the above-mentioned first selection may involve determining that received input data corresponds to a gesture indicative of the first selection. In one example, the gesture indicative of the first selection could take the form of receiving a voice command indicating the first selection. In another example, the gesture indicative of the first selection could take the form of particular mechanical input being provided via a mechanical interface of the computing device. For instance, that particular mechanical input may simply involve a press of a button on the device, among various other options.

Additionally, determining the above-mentioned second selection may involve determining that received input data corresponds to a gesture indicative of the second selection, such as by being indicative of the transition from the first channel to the second channel. By way of example, the gesture indicative of the transition could take the form of mechanical movement of a mechanical interface of the computing device. For instance, that mechanical movement may involve the above-mentioned "slide and hold" function of the above-mentioned slider and/or the above-mentioned "slide" function of the above-mentioned slider, among various other options.

In a further aspect, the computing device may output (e.g., via the audio output device) at least one audible notification providing information about being the channel being transitioned to (hereinafter "channel announcement"). In particular, as noted above, audio-provider servers (e.g., audio-provider servers 430 and/or 440) could each provide to the server 420 metadata specifying information about audio content. With this arrangement, the computing device may determine that input data corresponds to a gesture indicative of a transition and may responsively engage with the server 420 in a communication session in order to receive metadata related to the content associated with the channel. Based on that metadata, the computing device may then cause the audio output device to output an audible notification representative of information about the channel being transitioned to. For instance, the audible notification may specify a name of a playlist (e.g., "jazz music playlist") associated with that channel or may be a preview of content within the channel (e.g., output a portion of the content within the "jazz music playlist"), among others. Nonetheless, such an audible notification may be provided at any feasible time, such as during the transition, upon the computing device beginning to output the associated content, and/or upon a request by the user, among other possibilities.

In yet a further aspect, the server 420 may be configured to hold a state of a channel such that, once a gesture is received to transition away from a certain channel, the server 420 may store in data storage information specifying the most recent outputted portion of the associated content. In particular, content that is associated with a channel may include a plurality of audio track or may be at least one piece of audio having a plurality of timestamps each associated with a certain time along that piece of audio, among other possibilities. With this arrangement, the server 420 may determine (through communication with the computing device) that a channel was transitioned away from after a certain track or timestamp within that channel was outputted or otherwise reached in other ways. Responsively, the server 420 may store information associating that certain track or timestamp with the application-program account. In this way, once that same channel is selected again at a later time, the server 420 may provide that stored information to the computing device so that the computing device is then set to output the content from that channel beginning with that certain track or timestamp ("resuming content at last played position"). Other aspects are also possible.

Given the various implementations described above, navigation between channels may take the form of a "carousal" arrangement in which channels are arranged in a particular order (e.g., customizable by the user). With this arrangement, one or more particular gestures may cause transitions from one channel to the next based on that particular order ("scrolling through the channels"). And once the last channel in that order is reached, a transition to the initial channel in that order occurs and so on. Moreover, as the channel transitions occur in this manner, a particular channel may be reached within the "carousal" arrangement and then a further gesture indicative of selection that particular channel may cause the computing device to output content associated with that particular channel.

Figure 10A:
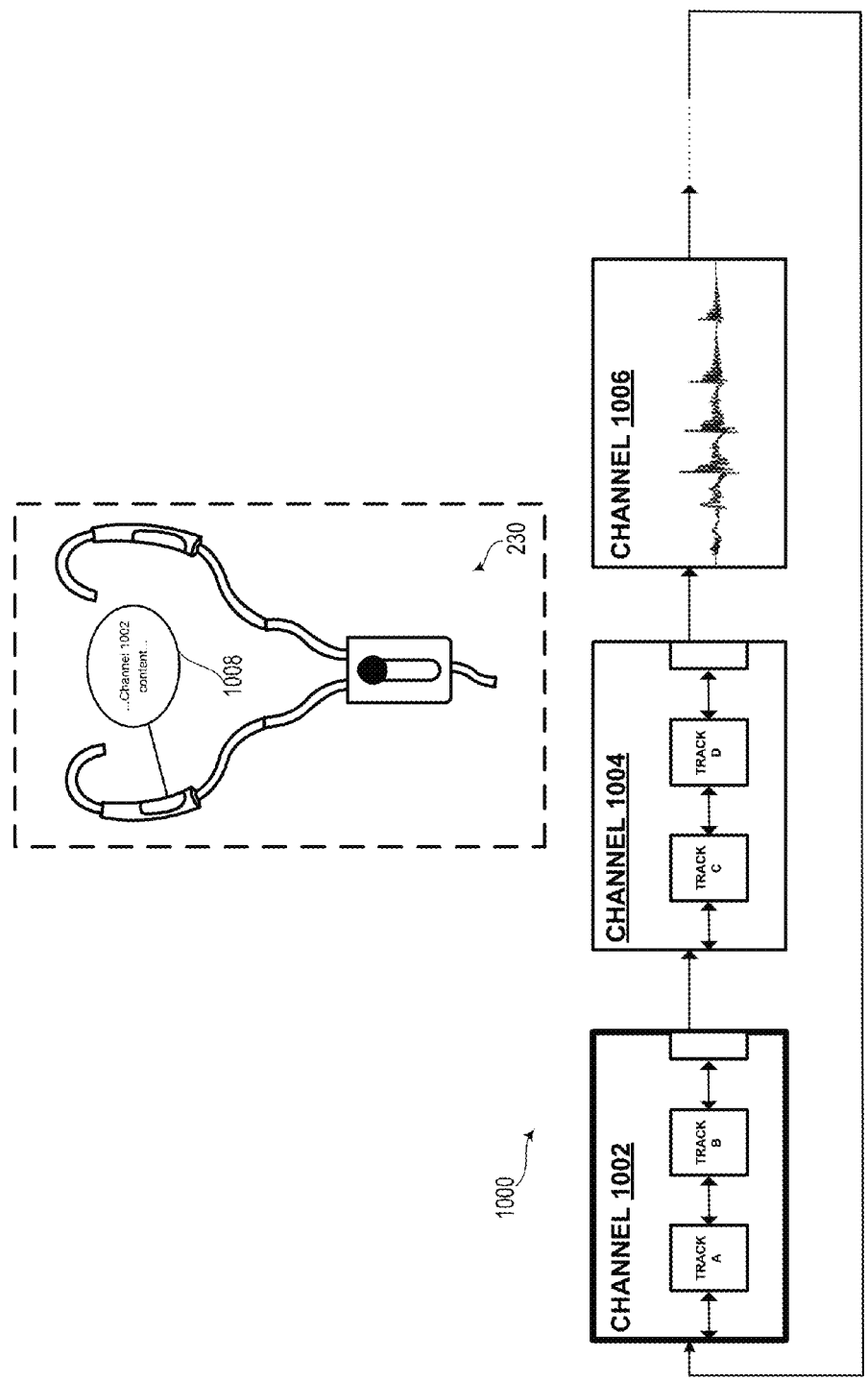
FIGS. 10A to 10B illustrate channel transition, according to an example implementation.
Figure 10B:
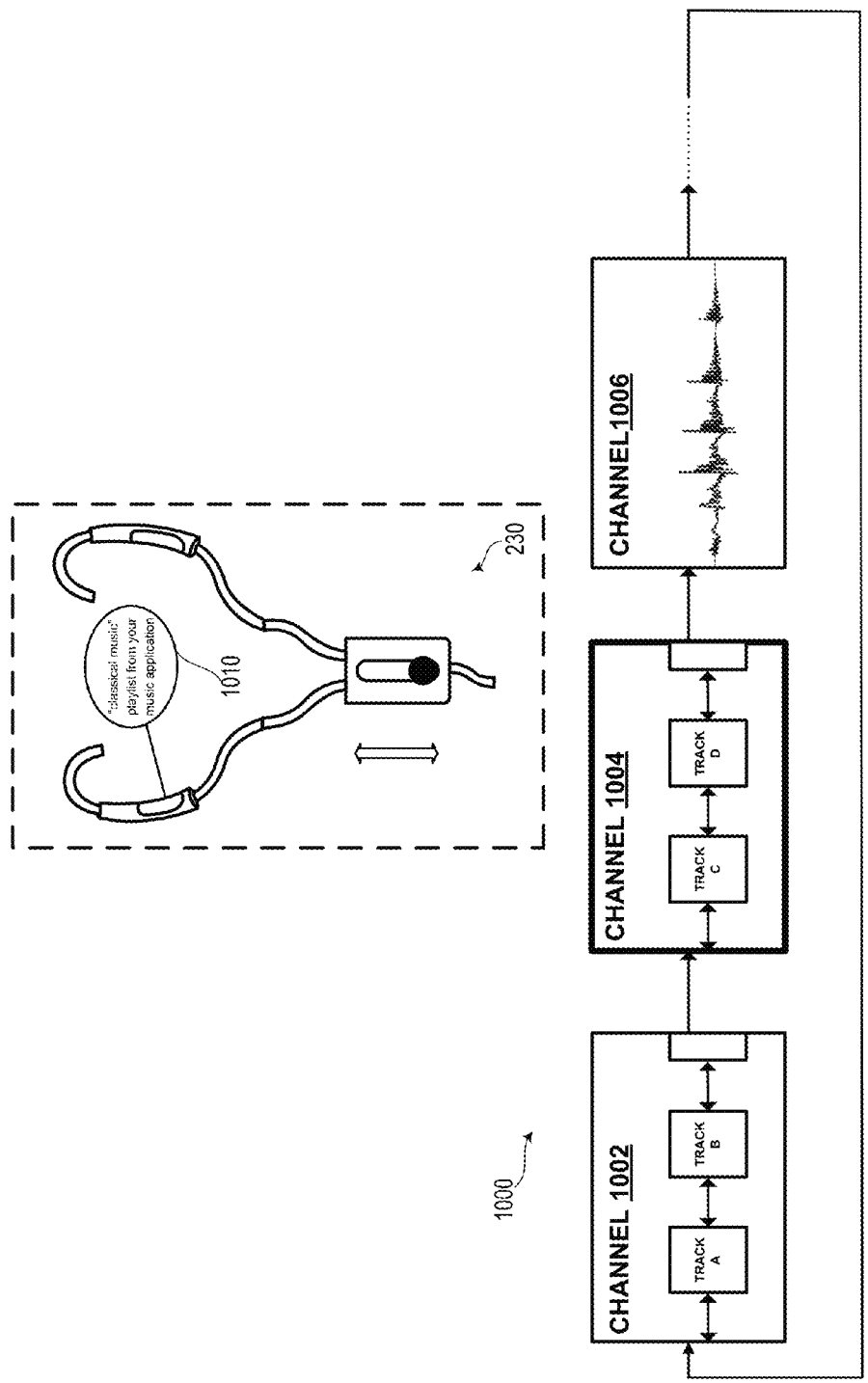

FIGS. 10A to 10B illustrate an example carousal arrangement 1000 including channels 1002 to 1006 and perhaps one or more other channels (not shown). With this arrangement, we may assume that channel 1002 provides access to a "jazz music" playlist, that channel 1004 provides access to a "classical music" playlist, and that channel 1006 provides access to a "universal jazz" broadcast. As such, FIG. 10A illustrates that that channel 1002 has been selected and that device 230 is outputting content 1008 of that channel 1002. Moreover, FIG. 10A illustrates that shaft 502 of the device 230 is at a first location. Once a user then seeks to transition through following channels of the carousal 1000, the user may then provide one or more gestures through the shaft 502.

In particular, FIG. 10B illustrate that shaft 502 has been moved to a second location. For instance, we may assume that the user is providing the "slide and hold" gesture that involves the shaft 502 moving from a first location to a second location followed by maintenance of the shaft 502 at the second location for at least a threshold duration. As such, during that maintenance at the second location, channels may transition from one to the next at a certain rate. Moreover, channel announcements may be carried out during each such transition from one channel to the next. For instance, FIG. 10B illustrates a transition from channel 1002 to channel 1004 and, during that transition, the device 230 is shown to output a channel announcement 1010 specifying the content associated with that channel 1004. Once the carousal 1000 reaches a channel that the user seeks to listen to, the user may stop actuating the shaft so as to stop maintenance of the shaft 502 at the second location. As such, the computing device may determine that the maintenance of the shaft 502 has stopped at time that a particular channel along the carousal was reached and may responsively determine selection of that particular channel, and thus may responsively output content associated with that particular channel. Other illustrations are also possible.

In a further aspect, navigation between channels may take on various forms when using a computing device that has a display (e.g., device 260). For instance, a GUI may include a listing of channels that have been previously added. Such a listing may include each added channel presented within a single screen state of the GUI. Alternatively, the added channels may be categorized in some manner (e.g., customizable by a user), such as based on type of content for example. In this case, the GUI may provide multiple such listing each including channels within a certain category, with these listing provided withing a single screen state of the GUI or within multiple screen states of the GUI. Nonetheless, the GUI may present each such added channel as being associated with the companion application rather than being associated with the audio-provider service providing the content within the channel (e.g., by not necessarily listing the name of the audio-provider service within a navigation section of the companion application). Other aspects are also possible.

D. Navigation within Channels

In an example implementation, after a certain channel has been selected and perhaps content associate with that channel is being outputted, navigation with the associated content of the channel may be based on various gestures. In practice, various forms of navigation may involve (but is not limited to): stopping output of content, pausing output of content, initiating playback of content, transition between audio tracks, and/or transition between timestamps (e.g., fast forward or rewind), among other possibilities. As such, each form of navigation may have at least one gesture associated with that form, so that once a particular gesture is detected (e.g., "swipe gesture"), the computing device may responsively carry out the associated form of navigation (e.g., transition to next timestamp).

As noted, each computing device may have corresponding gestures specific to that computing device, which may depend on the particular input device(s) included in that computing device. In this way, a certain computing device may have a certain corresponding set of gestures that are respectively associated with certain forms of navigation (e.g., each gesture associated with a particular form of navigation). And a different computing device may have a different corresponding set of gestures that are respectively associated with those same certain forms of navigation. For example, a user of device 200 may transition between timestamps associated with a channel by providing a "swipe" gesture on the touch pad 224. Whereas, a user of device 250 may transition between timestamps associated with a channel by providing a particular voice command (e.g., "next timestamp"). Other examples are also possible.

Moreover, in some cases, the same gesture on the same device may result in different operations or different forms of navigations based on characteristics of the channel begin navigated, such as based on a type of content associated with that channel (e.g., determined based on metadata received by the server 420). For instance, a computing device may determine a first type of content (e.g., music playlist including a plurality of audio tracks) associated with the first channel. In this instance, when the computing device detects a particular gesture, the particular device may responsively carry out a particular form of navigation (e.g., transition to a subsequent audio track). Yet in another instance, the computing device may determine a second type of content (e.g., audiobook including a plurality of timestamps) associated with the second channel. In this instance, when the computing device detects the same particular gesture, the particular device may responsively carry out a different form of navigation (e.g., transition to a subsequent timestamp).

Accordingly, in the context of audio tracks, the computing device may determine that input data corresponds to a particular gesture (e.g. a "slide" gesture or a "slide and hold" gesture) indicative of a transition from a first audio track to a second audio track an may responsively carry out the transition by causing the audio output device to output the second audio track instead of outputting the first audio track. Whereas, in the context of audio timestamps, the computing device may determine that input data corresponds to a particular gesture indicative of a transition from a first timestamp to a second timestamps (e.g., also a "slide" gesture or a "slide and hold" gesture) an may responsively carry out the timestamp transition by causing the audio output device to output content beginning with the associated second timestamp instead of outputting content associated with the first timestamp. Other instances are also possible.

In a further aspect, the computing device may output (e.g., via the audio output device) at least one audible notification providing information about being an audio track being transitioned to (hereinafter "track announcement"). In particular, as noted above, audio-provider servers (e.g., audio-provider servers 430 and/or 440) could each provide to the server 420 metadata specifying information about audio content. With this arrangement, the computing device may determine that input data corresponds to a gesture indicative of a transition to a certain audio track and may responsively engage with the server 420 in a communication session in order to receive metadata related to that certain audio track within the channel. Based on that metadata, the computing device may then cause the audio output device to output an audible notification representative of information about the audio track being transitioned to. For instance, the audible notification may specify a name of the audio track (e.g., "blues guitar by john smith") or may be a preview of the audio track (e.g., output a portion of "blues guitar by john smith"), among other options. Nonetheless, such an audible notification may be provided at any feasible time, such as during the transition, upon the computing device beginning to output the content of the audio track, and/or upon a request by the user, among other possibilities.

Given the various implementations described above, navigation between audio tracks may also take the form of a "carousal" arrangement in which audio tracks are arranged in a particular order (e.g., customizable by the user or order by the audio-provider service). With this arrangement, one or more particular gestures may cause transitions from one audio track to the next based on that particular order ("scrolling through the audio tracks"). And once the last audio track in that order is reached, a transition to the initial audio track in that order occurs and so on. Moreover, as the audio track transitions occur in this manner, a particular audio track may be reached within the "carousal" arrangement and then a further gesture indicative of selection that particular audio track may cause the computing device to output content associated with that particular audio track.

Figure 11A:
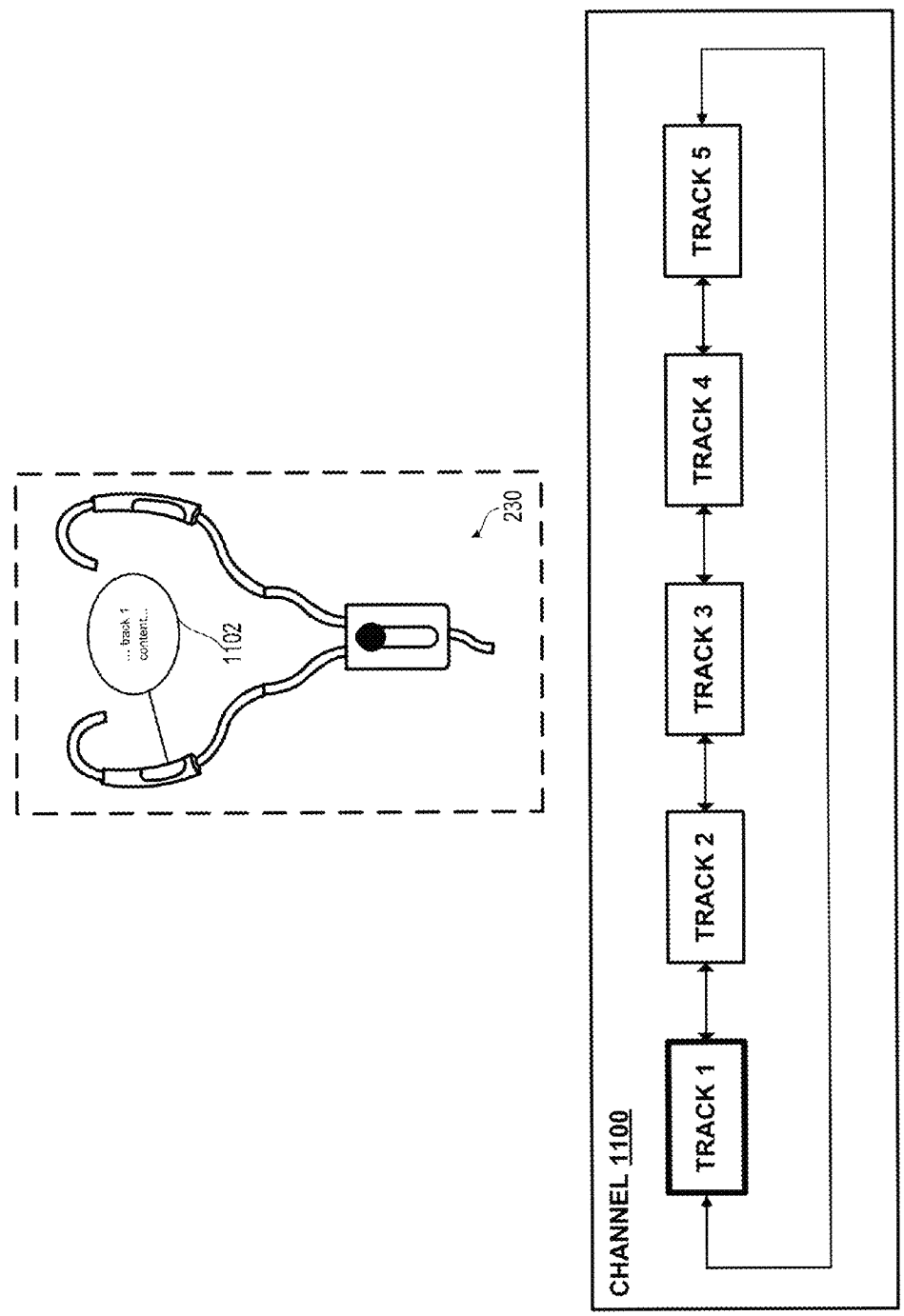
FIGS. 11A to 11B illustrate audio track transition, according to an example implementation.
Figure 11B:
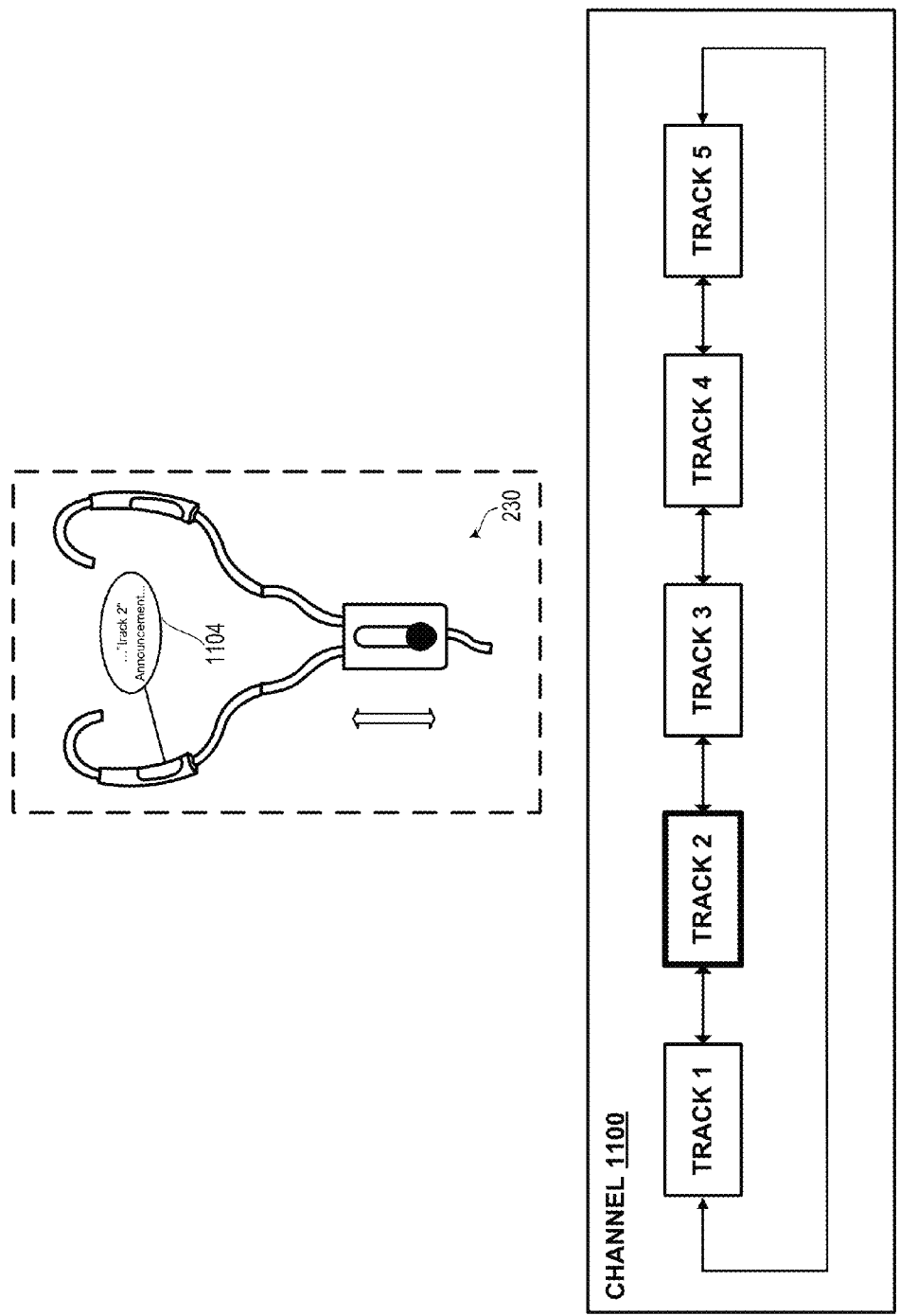

FIGS. 11A to 11B illustrate an example audio track carousal arrangement associated with a particular channel 1100 having five audio tracks 1 to 5. In particular, FIG. 11A illustrates that that "track 1" has been selected and that device 230 is outputting content 1102 of "track 1". Moreover, FIG. 11A illustrates that shaft 502 of the device 230 is at a first location. So once a user then seeks to transition through following audio tracks of the carousal arrangement associated with channel 1100, the user may then provide one or more gestures through the shaft 502.

More specifically, FIG. 11B illustrate that shaft 502 has been moved to a second location. For instance, we may assume that the user is providing the "slide" gesture that involves the shaft 502 moving from a first location to a second location. After each such "slide" gesture, an audio track may transition to a subsequent audio track in the carousal arrangement associated with channel 1100. Moreover, track announcements may be carried out during each such transition from one audio track to the next. For instance, FIG. 11B illustrates a transition from "track 1" to "track 2" and, during that transition, the device 230 is shown to output a track announcement 1104 associated with "track 2". Once the carousal reaches an audio track that the user seeks to listen to, the user may stop providing "slide" gesture(s). As such, the computing device may determine that "slide" gesture are no longer being receive at a time that a particular audio track along the carousal was reached, and may responsively determine selection of that particular audio truck. Thus, the computing device may then responsively output content associated with that particular audio track. Other illustrations are also possible.

V. Additional Features

In practice, the disclosed platform may provide for various additional features. While example additional features are described in below, various other features are possible as well without departing from the scope of the present disclosure.

A. Accessibility Across a Plurality of Devices

In an example implementation, as noted, a user may associate one or more of their devices (e.g., each having the companion application) with their respective account, such that they can be provided with access to the services via the companion application on the respective device. With this arrangement, once certain channels have been added through a certain computing device to the application-program account, those added channels are then accessible via a different computing device that also corresponds to the application-program account. In this way, the different computing device may output content of an added channel in response to a different selection of that channel via the different computing device.

For example, the server 420 may determine, in association with the different computing device, a first different selection of the above-mentioned first channel and may responsively send to the different computing device a first different instruction to output content from the above-mentioned first audio-provider service. Then, the server 420 may determine, also in association with the different computing device, a second different selection of the above-mentioned second channel and may responsively send to the different computing device a second different instruction to output content from the above-mentioned second audio-provider service. Other examples are also possible.

B. Auto-Created Channels

In an example implementation, the server 420 may be configured to automatically add channel to an application-program account and do so based on various factors. In particular, once the application-program program account has been created via a particular computing device or has otherwise been associated with the particular computing device, the server 420 may determine audio-provider services associated with that particular computing device (e.g., third-party applications found on the particular computing device). And once the server 420 determines these audio-provides services, the server 420 may responsively and automatically add one or more channels to the application-program account, with those channels providing access to content from one or more of the determined audio-provider services. By way of example, the server 420 may determine audio-provider services most commonly used (e.g., five most commonly used third-party applications) through the particular computing device and may automatically add channels each providing access to one of those commonly used audio-provider services. Other examples are also possible.

C. Channel Suggestions

In an example implementation, the disclosed platform may use various factors and consideration in order to provide suggestions of channel(s) to add to an application-program account and/or of channel selection from among previously added channels. In one example, the server 420 may determine at least one frequently selected channel (e.g., selected at a threshold high rate) and may then determine one or more features (e.g., at least one type of content or at least one type of genre) associated with that channel. Once the server 420 determines these features, the server 420 may determine other content from audio-provider services that also has one or more of these feature (e.g., content of the same genre). As such, once the server 420 determines such other content, the server 420 may then send an instruction to the computing device to output a suggestion (e.g., via a GUI or via an audible notification) of addition of that other content as a channel. Then, the computing device may receive input data that indicative of acceptance or of rejection of that suggestion, and may responsively coordinate with the server 420 to carry out further operations in accordance with that input data.

In another example, the server 420 may determine a context associated with a particular computing device that corresponds with the application-program account and may suggest a channel based that determined context. In particular, the computing device may receive input data indicating association of a particular channel with a particular context and may coordinate with the server 420 to carry out that association. For instance, the particular context may involve a "workout activity" and thus that association may involve determining particular sensor data received during the "workout activity" and then associating the particular sensor data with the particular channel per a request from a user. Then, at a later point in time, the computing device may receive sensor data from one or more sensors of the computing device and may provide that sensor data (or interpretation of the sensor data) to the server 420. Based on the sensor data, the server 420 may determine that the received sensor data is substantially the same as the above-mentioned particular sensor data (e.g., "workout activity" being performed again) and may responsively send to the computing instruction an instruction to provide a suggestion of the particular channel or an instruction to output the content associated with the particular channel, among other options.

In yet another example, the disclosed platform may provide suggestion upon recognition of newly added audio-provider services. In particular, the server 420 may determine a new audio-provider service (i.e., not previously associated with a particular computing device) newly associated with that particular computing device (e.g., new third-party applications added to the particular computing device). And once the server 420 determines that audio-provider service, the server 420 may responsively instruct the particular computing device to suggest addition of at least channel to the application-program account, with that channel providing access to content from the determine newly added audio-provider service. Other examples are also possible.

In a further aspect, the disclosed platform may provide channel suggestions at various possible times. For example, the server 420 may determine that a particular added channel is an "unused" channel due to not being frequently selected. For instance, the server 420 may make a determination that the particular added channel is selected at a rate that is lower than a threshold rate and/or may make a determination that the particular added channel has not been selected for at least a threshold time period. So in response to making one or more such determinations, the server 420 may send an instruction to the computing device to suggest addition of certain content as a channel.

In another example, the server 420 may instruct the computing device to provide a suggestion while the computing device is outputting content from another channel or once the computing device complete output of content from that other channel. For instance, the suggestion at issue may be a suggestion to add particular content as a channel, with that particular content being related to the channel being outputted, such as by being of the same type of content or of the same genre, among other possibilities. In another instance, the suggestion at issue may be a suggestion to begin outputting a previously added channel that is associated with the same application-program account as the channel being outputted. Similarly, the suggested previously added channel may be related to the channel being outputted, such as by being of the same type of content or of the same genre, among other possibilities. Other aspects and examples are also possible.

D. Content from Multiple Sources in a Single Channel

In an example implementation, the disclosed platform may allow for addition of a single channel that provides access to content from two or more different sources. For instance, the server 420 may receive a request to add a channel that provides access to content from a first audio-provider service, to content from a second audio-provider service, and/or to locally stored content, among other possibilities. Once that channel is added, selection of that channel may then result in output of content from those various different sources via a computing device associated with the application-program account.

E. Channel Removal

In an example implementation, the disclosed platform may allow for removal of one or more previously added channels. In particular, the computing device may receive input data and may coordinate with the server 420 to determine that the received input data corresponds to request to remove a particular channel. Responsively, the server 420 may then remove the particular channel such that the particular channel is no longer associated with the application-program account.

Moreover, channel removal may also occur in various other situations. For instance, a third-party application may no longer have certain content associated with a channel and thus that channel may be responsively removed. In another instance, a user may select content on the device via an application other than the companion application and a "temporary" channel may responsively be created based on that content. Once the end of content within the temporary channel is reached, a user may provide a gesture to add the temporary channel as a channel associated with the account. Otherwise, the temporary channel may be removed.

F. Platform Selection of an Audio Source

In an example implementation, the disclosed platform may provide for selection of an audio source based on input provided a user, yet with the user may necessarily selecting a particular channel. For example, the computing device may receive a play request specifying desired content (e.g., "play john smith") and may then use that information (e.g., in coordination with the server 420) as basis to determine a particular channel to output or particular content from a particular audio-provider service to output, among other audio sources. In practice, the server 420 may determine metadata specifying information that matches information specified in the play request, such as by matching a sequence of letters, numbers, and/or characters specified in the play request for instance. Then, the server 420 may inform the computing device of channel or other content associated with the matching metadata, so that the computing device could then output an indication of that audio content or simply begin outputting that content or channel. In this way, the disclosed platform may be capable of determining an audio source most appropriate to handle a play request provided by a user.

G. Ducking Versus Pausing Content Based on Type of Content

In an example implementation, the disclosed platform may provide an approach for handling audible notification (e.g., a notification of an incoming call or a notification of an incoming text message or the like) that needs to be outputted by a computing device while that computing device is already outputting content associated with a particular channel. More specifically, that approach may involve ducking the content or pausing the content based on the type of content associated with the particular channel. In practice, ducking may be defined as a reduction in volume of at which the content of the particular channel is being outputted. Whereas, pausing may be defined as temporarily halting the outputting of content of the particular channel. As such, the computing device and the server 420 may coordinate to determine the type of content and to make a decision as to whether to duck or to pause based on the type of content.

Accordingly, while the particular channel's associated content is being outputted by the computing device's audio output device, the computing device may determine that the audible notification is set to be outputted by the audio output device. Responsively, the computing device may engage with the server in a communication session to determine at least one type of content of the associated content being outputted. So based on the determine type of content, the computing device may make a determination of whether (i) to pause output of the associated content while the audible notification is being outputted or (ii) to duck output of the associated content while the audible notification is also being outputted (e.g., at a higher volume than the volume of associated content). After making the determination, the computing device may then cause the audio output device to output the audible notification in accordance with the determination.

Figure 12A:
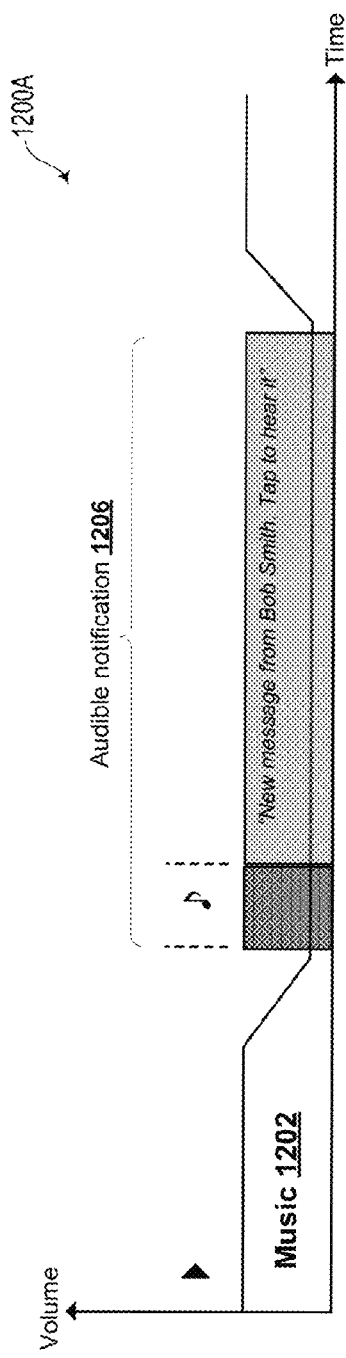
FIGS. 12A to 12B illustrate ducking versus pausing based on type of content, according to an example implementation.
Figure 12B:
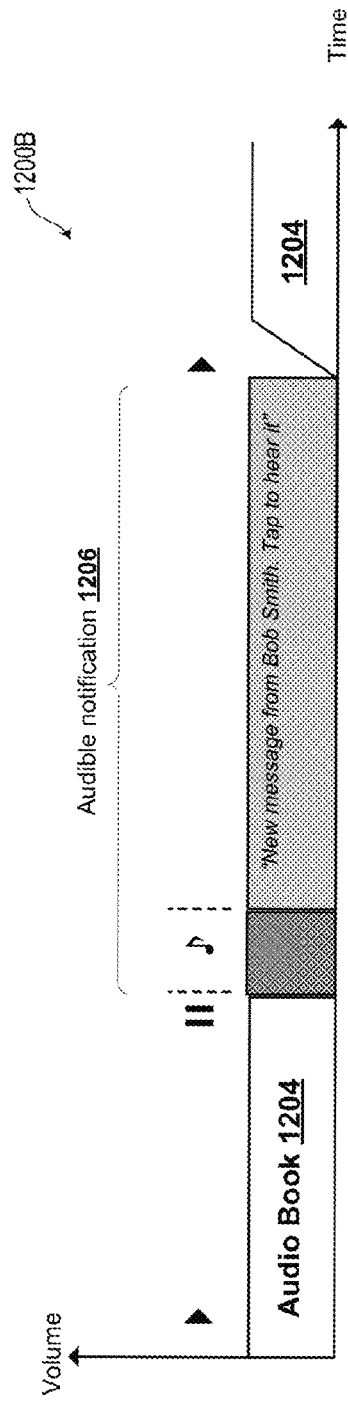

FIGS. 12A to 12B illustrate example of such ducking versus pausing consideration. In particular, FIG. 12A illustrates a graph 1200A showing volume being outputted from a computing device's audio output device over time. As shown, the audio output device is initially outputting a channel's music 1202 at a certain volume. Then, the computing device determines that an audible notification 1206 is to be outputted (e.g., an audible ring followed by an indication of "new message from bob smith, tap to hear"). Responsively, the computing device may engage in a communication session with the server 420 and may determine that the type of content of the channel is simply music. As such, the computing device may responsively duck the music 1202 being outputted for the duration of the audible notification. In this way, the user may have an uninterrupted music listening experience while still having the audible notification be outputted.

In contrast, FIG. 12B illustrates a scenario pausing outputted content is carried out. In particular, as shown by graph 1200B, the audio output device is initially outputting a channel's audio book 1204 at a certain volume. Then, the computing device determines that the audible notification 1206 is to be outputted. Responsively, the computing device may engage in a communication session with the server 420 and may determine that the type of content of the channel is an audio book. As such, the computing device may responsively pause the audio book 1204 being outputted for at least the time period during which the audible notification is being outputted. In this way, spoken word content of the audio book 1204 could still be perceived by a user. Other features are also possible.

VI. Illustrative Methods

A. Computing Device Perspective

Figure 13:
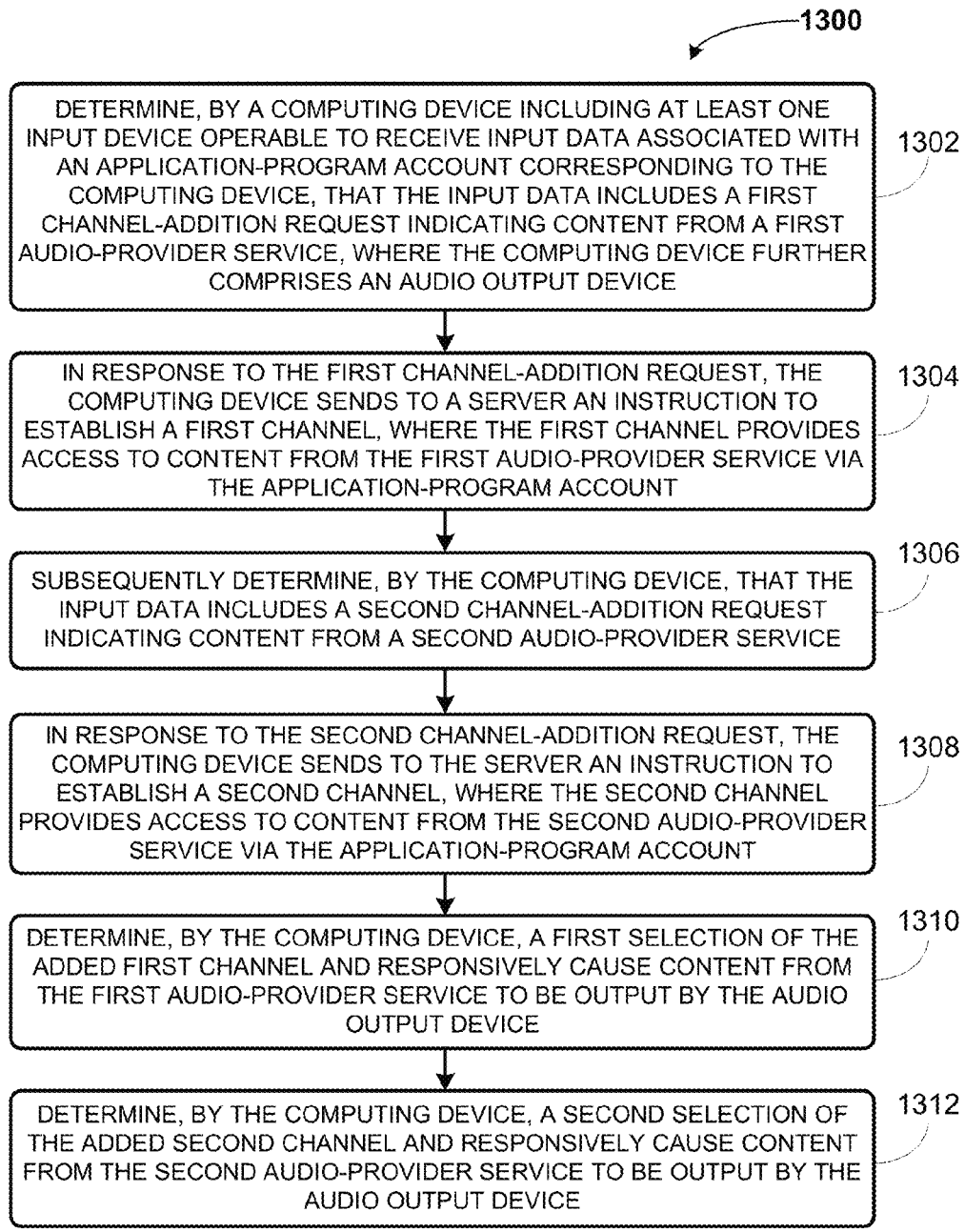
FIGS. 13 and 14 respectively illustrate example flowcharts for creation and control of channels, according to an example implementation.

FIG. 13 is a flowchart illustrating a method 1300, according to an example implementation. Illustrative methods, such as method 1300, may be carried out in whole or in part by a component or components in a computing device, such as by the computing device 100 described above. However, it should be understood that example methods, such as method 1300, may be carried out by other entities or combinations of entities (e.g., by other devices and/or combinations of devices), without departing from the scope of the disclosure.

It should be understood that for this and other processes and methods disclosed herein, flowcharts show functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

As shown by block 1302, method 1300 involves determining, by a computing device including at least one input device operable to receive input data associated with an application-program account corresponding to the computing device, that the input data includes a first channel-addition request indicating content from a first audio-provider service, where the computing device further comprises an audio output device.

As shown by block 1304, method 1300 then involves, in response to the first channel-addition request, the computing device sending to a server an instruction to establish a first channel, where the first channel provides access to content from the first audio-provider service via the application-program account.

As shown by block 1306, method 1300 then involves subsequently determining, by the computing device, that the input data includes a second channel-addition request indicating content from a second audio-provider service.

As shown by block 1308, method 1300 then involves, in response to the second channel-addition request, the computing device sending to the server an instruction to establish a second channel, where the second channel provides access to content from the second audio-provider service via the application-program account.

As shown by block 1310, method 1300 then involves determining, by the computing device, a first selection of the added first channel and responsively causing content from the first audio-provider service to be output by the audio output device.

As shown by block 1312, method 1300 then involves determining, by the computing device, a second selection of the added second channel and responsively causing content from the second audio-provider service to be output by the audio output device.

B. Server Perspective

Figure 14:
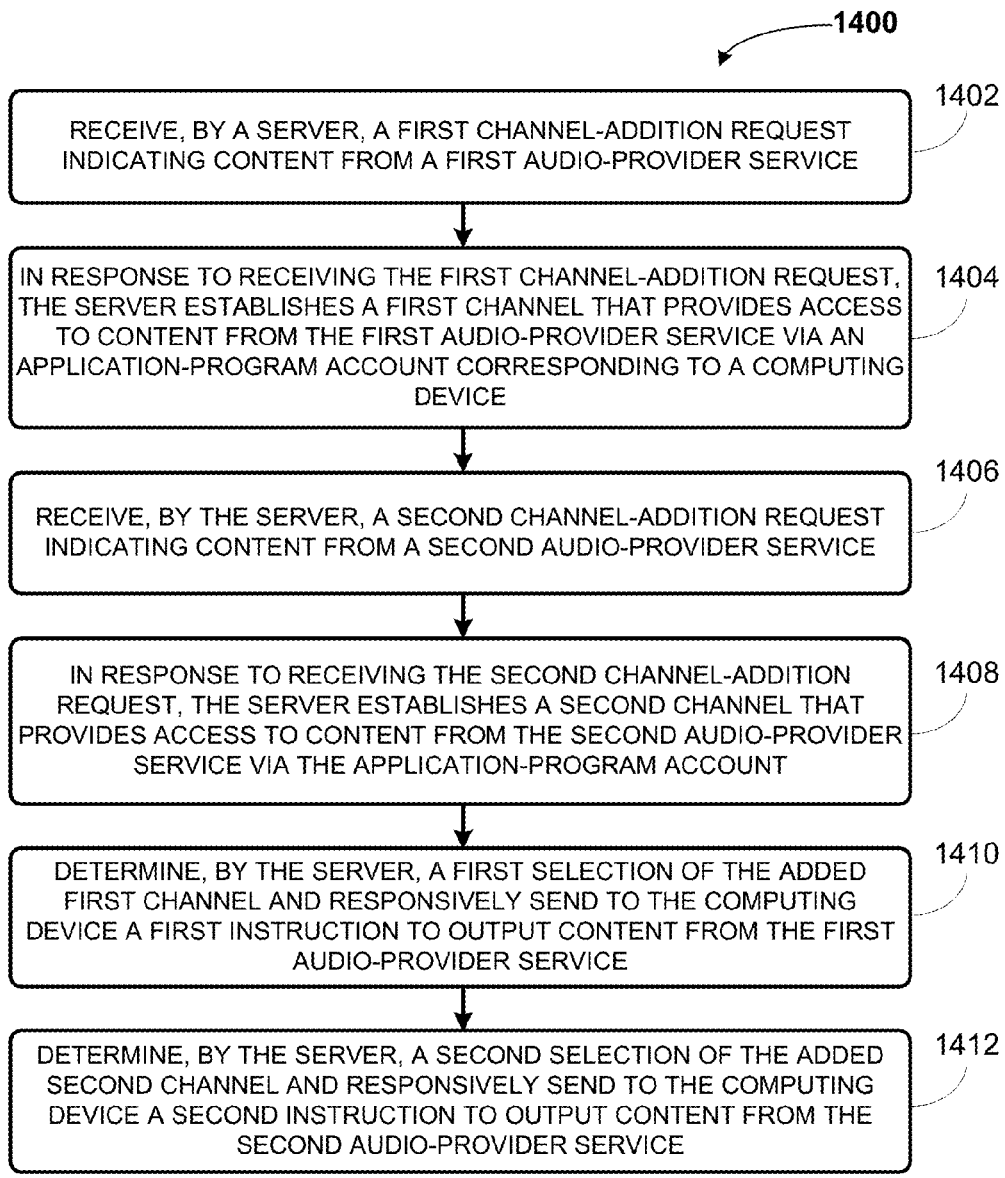

Finally, FIG. 14 is a flowchart illustrating a method 1400, according to an example implementation. Illustrative methods, such as method 1400, may be carried out in whole or in part by a component or components in a server, such as by the server 300 described above. However, it should be understood that example methods, such as method 1400, may be carried out by other entities or combinations of entities (e.g., by other devices and/or combinations of devices), without departing from the scope of the disclosure.

As shown by block 1402, method 1400 involves receiving, by a server, a first channel-addition request indicating content from a first audio-provider service.

As shown by block 1404, method 1400 then involves, in response to receiving the first channel-addition request, the server establishing a first channel that provides access to content from the first audio-provider service via an application-program account corresponding to a computing device.

As shown by block 1406, method 1400 then involves receiving, by the server, a second channel-addition request indicating content from a second audio-provider service.

As shown by block 1408, method 1400 then involves, in response to receiving the second channel-addition request, the server establishing a second channel that provides access to content from the second audio-provider service via the application-program account.

As shown by block 1410, method 1400 then involves determining, by the server, a first selection of the added first channel and responsively sending to the computing device a first instruction to output content from the first audio-provider service.

As shown by block 1412, method 1400 then involves determining, by the server, a second selection of the added second channel and responsively sending to the computing device a second instruction to output content from the second audio-provider service.

VII. Conclusion

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

We claim:

1. A computing device comprising:
at least one input device operable to receive input data associated with an application-program account corresponding to the computing device;
an audio output device;
one or more processors;
a non-transitory computer readable medium; and
program instructions stored on the non-transitory computer readable medium and executable by the one or more processors to:
in response to determining that the input data comprises a first channel-addition request indicating content from a first audio-provider service, send to a first server an instruction to establish a first channel, wherein the first channel provides access to content from the first audio-provider service via the application-program account;
in response to determining that the input data comprises a second channel-addition request indicating content from a second audio-provider service, send to the first server an instruction to establish a second channel, wherein the second channel provides access to content from the second audio-provider service via the application-program account, wherein the second audio-provider service corresponds to a second server, and wherein the first server has stored thereon information that (i) has been obtained from the second server and (ii) specifies at least one type of content associated with content from the second audio-provider service;
determine a first selection of the added first channel and responsively cause content from the first audio-provider service to be output by the audio output device;
determine a second selection of the added second channel and responsively cause content from the second audio-provider service to be output by the audio output device;
while causing content from the second audio-provider service to be output by the audio output device, determine that an audible notification is to be outputted by the audio output device;
in response to determining that the audible notification is to be outputted by the audio output device, engage with the first server in a communication session to determine the at least one type of content associated with content from the second audio-provider service;
based on the determined at least one type of content associated with content from the second audio-provider service, make a further determination of whether (i) to cause the audio output device to stop outputting content from the second audio-provider service while the audible notification is being outputted by the audio output device or (ii) to cause the audio output device to continue outputting content from the second audio-provider service at a reduced volume while the audible notification is also being outputted by the audio output device; and
after making the further determination, cause the audio output device to output the audible notification in accordance with the further determination.

2. The computing device of claim 1, wherein the computing device is a screenless wearable device.

3. The computing device of claim 1, wherein the at least one input device comprises one or more of the following devices: at least one microphone, at least one touch-based interface, and at least one mechanical interface.

4. The computing device of claim 1, wherein the application-program account also corresponds to a different computing device, and wherein the added first and second channels are each accessible via a different selection on the different computing device.

5. The computing device of claim 1, wherein the application-program account is stored at the first server, and wherein the program instructions are further executable to:
engage in a direct communication session with the application-program account stored at the first server, and
wherein the first and second selections each respectively occur during the direct communication session with the application-program account.

6. The computing device of claim 1, wherein the first audio-provider service is associated with a first audio-provider account that also corresponds to the computing device.

7. The computing device of claim 1,
wherein the first audio-provider service corresponds to a first audio-provider server that stores content to which the first channel provides access, and wherein the second audio-provider service corresponding to a second server comprises the second audio-provider service corresponding to a second audio-provider server that stores content to which the second channel provides access.

8. The computing device of claim 1, wherein the program instructions are further executable to:
subsequently determine that the input data comprises a third channel-addition request indicating content from the non-transitory computer readable medium; and
in response to the third channel-addition request, send to the first server an instruction to establish a third channel that provides access to content from the non-transitory computer readable medium via the application-program account.

9. The computing device of claim 1, wherein the program instructions being executable to determine the first selection comprises the program instructions being executable to determine that the input data corresponds to a gesture indicative of the first selection.

10. The computing device of claim 9, wherein the at least one input device comprises at least one mechanical interface, and wherein the gesture comprises a particular mechanical input that is provided via the at least one mechanical interface and is indicative of the first selection.

11. The computing device of claim 1, wherein the program instructions being executable to determine the second selection comprises the program instructions being executable to determine that the input data corresponds to a gesture indicative of the second selection.

12. The computing device of claim 11,
wherein the gesture being indicative of the second selection comprises the gesture being indicative of a transition from (i) the added first channel to (ii) the added second channel, and
wherein the program instructions being executable to responsively cause content from the second audio-provider service to be output by the audio output device comprises the program instructions being executable to carry out the transition by causing the audio output device to output content from the second audio-provider service instead of outputting content from the first audio-provider service.

13. The computing device of claim 12, wherein the at least one input device comprises at least one mechanical interface, and wherein the gesture indicative of the transition comprises a mechanical movement of the at least one mechanical interface.

14. The computing device of claim 13, wherein the mechanical movement comprises a movement of the at least one mechanical interface from a first location to a second location followed by maintenance of the at least one mechanical interface at the second location for at least a threshold duration.

15. The computing device of claim 12, wherein the second audio-provider service corresponding to a second server comprises the second audio-provider service corresponding to a second audio-provider server that stores content to which the second channel provides access, wherein the first server has stored thereon information that is related to content to which the second channel provides access and that has been obtained from the second audio-provider server, and wherein the program instructions are further executable to:
in response to determining that the input data corresponds to the gesture indicative of the transition, engage with the first server in a communication session to receive the information related to content to which the second channel provides access; and
cause the audio output device to output a notification representative of the received information that is related to content to which the second channel provides access.

16. The computing device of claim 1, wherein content from the second audio-provider service comprises at least first and second audio tracks, wherein the program instructions being executable to responsively cause content from the second audio-provider service to be output by the audio output device comprises the program instructions being executable to responsively cause the first audio track to be output by the audio output device, and wherein the program instructions are further executable to:
subsequently determine that the input data corresponds to a gesture indicative of a transition from (i) the first audio track to (ii) the second audio track; and
in response to subsequently determining that the input data corresponds to the gesture, carry out the transition by causing the audio output device to output the second audio track instead of outputting the first audio track.

17. The computing device of claim 16, wherein the at least one input device comprises at least one mechanical interface, and wherein the gesture indicative of the transition comprises a mechanical movement of the at least one mechanical interface from a first particular location to a second particular location.

18. The computing device of claim 16, wherein the second audio-provider service corresponding to a second server comprises the second audio-provider service corresponding to a second audio-provider server that stores content to which the second channel provides access, wherein the first server has stored thereon information that (i) has been obtained from the second audio-provider server and (ii) is respectively related to the first and second audio tracks, and wherein the program instructions are further executable to:
in response to subsequently determining that the input data corresponds to the gesture indicative of the transition, engage with the first server in a communication session to receive the information related to the second audio track; and
cause the audio output device to output a notification representative of the received information that is related to the second audio track.

19. A computing device comprising:
an audio output device;
one or more processors;
a non-transitory computer readable medium; and
program instructions stored on the non-transitory computer readable medium and executable by the one or more processors to:
cause content from an audio-provider service to be output by the audio output device;
while causing content from the audio-provider service to be output by the audio output device, determine that an audible notification is to be outputted by the audio output device;
in response to determining that the audible notification is to be outputted by the audio output device, determine at least one type of content associated with content from the audio-provider service;
based on the determined at least one type of content associated with content from the audio-provider service, make a further determination of whether (i) to cause the audio output device to stop outputting content from the audio-provider service while the audible notification is being outputted by the audio output device or (ii) to cause the audio output device to continue outputting content from the audio-provider service at a reduced volume while the audible notification is also being outputted by the audio output device; and after making the further determination, cause the audio output device to output the audible notification in accordance with the further determination.

20. A server comprising:
one or more processors;
a non-transitory computer readable medium; and
program instructions stored on the non-transitory computer readable medium and executable by the one or more processors to:
   receive a first channel-addition request indicating content from a first audio-provider service;
   in response to receiving the first channel-addition request, establish a first channel that provides access to content from the first audio-provider service via an application-program account corresponding to a computing device;
   receive a second channel-addition request indicating content from a second audio-provider service;
   in response to receiving the second channel-addition request, establish a second channel that provides access to content from the second audio-provider service via the application-program account;
   determine a first selection of the added first channel and responsively send to the computing device a first instruction to output content from the first audio-provider service;
   determine a second selection of the added second channel and responsively send to the computing device a second instruction to output content from the second audio-provider service, wherein the second instruction instructs the computing device to output content from the second audio-provider service via an audio output device of the computing device;
   receive, from a second audio-provider server that stores content from the second audio-provider service, information that specifies at least one type of content associated with content from the second audio-provider service;
   receive, from the computing device, an indication that an audible notification is to be outputted via the audio output device of the computing device;
   in response to receiving the indication and based on the at least one type of content, make a further determination of whether (i) to instruct the computing device to stop outputting content from the second audio-provider service via the audio output device while the audible notification is being outputted via the audio output device or (ii) to instruct the computing device to continue outputting content from the second audio-provider service via the audio output device at a reduced volume while the audible notification is also being outputted via the audio output device; and
   after making the further determination, transmit, to the computing device, a further instruction in accordance with the further determination.

21. The server of claim 20, wherein the computing device is a screenless wearable device.

22. The server of claim 20, wherein the first and second selections are each respectively in association with the computing device, wherein the application-program account also corresponds to a different computing device, and wherein the program instructions are further executable to:
   determine, in association with the different computing device, a first different selection of the added first channel and responsively send to the different computing device a first different instruction to output content from the first audio-provider service; and
   determine, in association with the different computing device, a second different selection of the added second channel and responsively send to the different computing device a second different instruction to output content from the second audio-provider service.

23. The server of claim 20, wherein the application-program account is stored at the server, wherein the program instructions are further executable to:
   engage with the computing device in a direct communication session associated with the application-program account stored at the server, and
   wherein the first and second selections each respectively occur during the direct communication session associated with the application-program account stored at the server.

24. The server of claim 20, wherein the first audio-provider service is associated with a first audio-provider account that also corresponds to the computing device.

25. The server of claim 20,
   wherein the first audio-provider service corresponds to a first audio-provider server that stores content to which the first channel provides access, and
   wherein the second audio-provider server stores content to which the second channel provides access.

26. The server of claim 25,
   wherein the first instruction to output content from the first audio-provider service comprises an instruction to stream content from the first audio-provider server and to output, by an audio output device of the computing device, content being streamed from the first audio-provider server; and
   wherein the second instruction to output content from the second audio-provider service comprises an instruction to stream content from the second audio-provider server and to output, by the audio output device of the computing device, content being streamed from the second audio-provider server.

27. The server of claim 20, wherein the program instructions are further executable to:
   receive a third channel-addition request indicating content stored at the computing device; and
   in response to receiving the third channel-addition request, establish a third channel that provides access via the application-program account to content stored at the computing device.

28. The server of claim 20, wherein the program instructions being executable to determine a first selection of the added first channel and responsively send to the computing device a first instruction to output content from the first audio-provider service comprises the program instructions being executable to:
   receive, from the computing device, input data provided via at least one input device of the computing device;
   determine that the received input data corresponds to a gesture indicative of the first selection; and
   in response to determining that the received input data corresponds to the gesture indicative of the first selection, send the first instruction to the computing device.

29. The server of claim 20, wherein the program instructions being executable to determine a second selection of the added second channel and responsively send to the computing device a second instruction to output content from the second audio-provider service comprises the program instructions being executable to:
  receive, from the computing device, input data provided via at least one input device of the computing device;
  determine that the received input data corresponds to a gesture indicative of the second selection; and
  in response to determining that the received input data corresponds to the gesture indicative of the second selection, send the second instruction to the computing device.

30. A server comprising:
one or more processors;
a non-transitory computer readable medium; and
program instructions stored on the non-transitory computer readable medium and executable by the one or more processors to:
  send, to a computing device, an instruction to output content from an audio-provider service via an audio output device of the computing device;
  receive, from an audio-provider server that stores content from the audio-provider service, information that specifies at least one type of content associated with content from the audio-provider service;
  receive, from the computing device, an indication that an audible notification is to be outputted via the audio output device of the computing device;
  in response to receiving the indication and based on the at least one type of content, make a determination of whether (i) to instruct the computing device to stop outputting content from the audio-provider service via the audio output device while the audible notification is being outputted via the audio output device or (ii) to instruct the computing device to continue outputting content from the audio-provider service via the audio output device at a reduced volume while the audible notification is also being outputted via the audio output device; and
  after making the determination, transmit, to the computing device, a further instruction in accordance with the determination.

31. A method comprising:
determining, by a computing device comprising at least one input device operable to receive input data associated with an application-program account corresponding to the computing device, that the input data comprises a first channel-addition request indicating content from a first audio-provider service, wherein the computing device further comprises an audio output device;
in response to the first channel-addition request, the computing device sending to a first server an instruction to establish a first channel, wherein the first channel provides access to content from the first audio-provider service via the application-program account;
subsequently determining, by the computing device, that the input data comprises a second channel-addition request indicating content from a second audio-provider service, wherein the second audio-provider service corresponds to a second server, wherein the first server has stored thereon information that (i) has been obtained from the second server and (ii) specifies at least one type of content associated with content from the second audio-provider service;
in response to the second channel-addition request, the computing device sending to the first server an instruction to establish a second channel, wherein the second channel provides access to content from the second audio-provider service via the application-program account;
determining, by the computing device, a first selection of the added first channel and responsively causing content from the first audio-provider service to be output by the audio output device;
determining, by the computing device, a second selection of the added second channel and responsively causing content from the second audio-provider service to be output by the audio output device;
while causing content from the second audio-provider service to be output by the audio output device, determining, by the computing device, that an audible notification is to be outputted by the audio output device;
in response to determining that the audible notification is to be outputted by the audio output device, engaging, by the computing device, with the first server in a communication session to determine the at least one type of content associated with content from the second audio-provider service;
based on the determined at least one type of content associated with content from the second audio-provider service, making a further determination, by the computing device, of whether (i) to cause the audio output device to stop outputting content from the second audio-provider service while the audible notification is being outputted by the audio output device or (ii) to cause the audio output device to continue outputting content from the second audio-provider service at a reduced volume while the audible notification is also being outputted by the audio output device; and
after making the further determination, causing, by the computing device, the audio output device to output the audible notification in accordance with the further determination.

32. A method comprising:
receiving, by a first server, a first channel-addition request indicating content from a first audio-provider service;
in response to receiving the first channel-addition request, the first server establishing a first channel that provides access to content from the first audio-provider service via an application-program account corresponding to a computing device;
receiving, by the first server, a second channel-addition request indicating content from a second audio-provider service;
in response to receiving the second channel-addition request, the first server establishing a second channel that provides access to content from the second audio-provider service via the application-program account;
determining, by the first server, a first selection of the added first channel and responsively sending to the computing device a first instruction to output content from the first audio-provider service;
determining, by the first server, a second selection of the added second channel and responsively sending to the computing device a second instruction to output content from the second audio-provider service via an audio output device of the computing device;
receiving, by the first server from a second server that stores content from the second audio-provider service, information that specifies at least one type of content associated with content from the second audio-provider service;

receiving, by the first server from the computing device, an indication that an audible notification is to be outputted via the audio output device of the computing device;

in response to receiving the indication and based on the at least one type of content, making a determination, by the first server, of whether (i) to instruct the computing device to stop outputting content from the second audio-provider service via the audio output device while the audible notification is being outputted via the audio output device or (ii) to instruct the computing device to continue outputting content from the second audio-provider service via the audio output device at a reduced volume while the audible notification is also being outputted via the audio output device; and after making the further determination, transmitting, by the first server to the computing device, a further instruction in accordance with the further determination.

* * * * *